United States Patent
Suryanarayanan et al.

(10) Patent No.: US 9,288,262 B2
(45) Date of Patent: *Mar. 15, 2016

(54) AUTOMATED DESKTOP PLACEMENT

(71) Applicant: Amazon Technologies, Inc., Seattle, WA (US)

(72) Inventors: Deepak Suryanarayanan, Seattle, WA (US); David Everard Brown, Western Cape (ZA); Malcolm Russell Ah Kun, Bellevue, WA (US); Eugene Michael Farrell, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/670,267

(22) Filed: Mar. 26, 2015

(65) Prior Publication Data

US 2015/0201009 A1 Jul. 16, 2015

Related U.S. Application Data

(63) Continuation of application No. 13/794,490, filed on Mar. 11, 2013, now Pat. No. 9,002,982.

(51) Int. Cl.
*H04L 29/08* (2006.01)
*H04L 12/911* (2013.01)

(52) U.S. Cl.
CPC ............ *H04L 67/10* (2013.01); *H04L 47/70* (2013.01); *H04L 67/1097* (2013.01); *H04L 67/306* (2013.01); *H04L 67/327* (2013.01)

(58) Field of Classification Search
CPC ..... H04L 67/10; H04L 47/70; H04L 67/1097; H04L 67/306; H04L 67/327
USPC ........................................................ 709/217
See application file for complete search history.

(56) References Cited

U.S. PATENT DOCUMENTS 4,991,089 A  2/1991  Shorter
6,223,289 B1  4/2001  Wall et al.
(Continued)

FOREIGN PATENT DOCUMENTS

CN      101964860 A  *  2/2011
WO    WO 2014/164075     10/2014
(Continued)

OTHER PUBLICATIONS

Dropbox-Features-Dropbox for Teams, available at http://www.dopbox.com/teams/features, last accessed on Mar. 29, 2013.
(Continued)

*Primary Examiner* — Kostas Katsikis
(74) *Attorney, Agent, or Firm* — Knobbe, Martens, Olson & Bear, LLP

(57) ABSTRACT

Systems and methods are presented for enabling a user to provide rules for the placement of computing resources at a data center for an entity that employs or is associated with the user. The data center can use the placement rules to select a data center computer system to host computing resources for a user. The rules can be used to establish diversity in computing resource placement at the data center thereby reducing the number of users who lose access to computing resources when a specific data center computer suffers a failure. Further, the placement rules can be used to facilitate configuration of the computer resources for the user based, for example, on the user's employment responsibilities.

18 Claims, 14 Drawing Sheets

(56) References Cited

U.S. PATENT DOCUMENTS

| | | | |
|---|---|---|---|
| 6,615,264 B1 | 9/2003 | Stoltz et al. | |
| 6,785,894 B1 | 8/2004 | Ruberg | |
| 6,895,588 B1 | 5/2005 | Ruberg | |
| 7,209,945 B2 | 4/2007 | Hicks, III et al. | |
| 7,577,722 B1 | 8/2009 | Khandekar et al. | |
| 7,865,586 B2 | 1/2011 | Cohn | |
| 7,953,865 B1 | 5/2011 | Miller et al. | |
| 7,991,859 B1 | 8/2011 | Miller et al. | |
| 8,201,237 B1 | 6/2012 | Doane et al. | |
| 8,386,757 B1 | 2/2013 | Midgley et al. | |
| 8,904,081 B1 | 12/2014 | Kulkarni | |
| 8,918,392 B1 | 12/2014 | Brooker et al. | |
| 9,002,982 B2 | 4/2015 | Suryanarayanan | |
| 9,148,350 B1 | 9/2015 | Suryanarayanan et al. | |
| 2002/0046300 A1 | 4/2002 | Hanko et al. | |
| 2002/0133529 A1 | 9/2002 | Schmidt | |
| 2003/0078965 A1* | 4/2003 | Cocotis et al. | 709/203 |
| 2003/0079030 A1* | 4/2003 | Cocotis et al. | 709/229 |
| 2003/0200295 A1 | 10/2003 | Roberts et al. | |
| 2006/0031529 A1 | 2/2006 | Keith, Jr. | |
| 2007/0136195 A1 | 6/2007 | Banjo | |
| 2007/0174410 A1* | 7/2007 | Croft et al. | 709/208 |
| 2007/0255814 A1* | 11/2007 | Green et al. | 709/223 |
| 2008/0049786 A1* | 2/2008 | Ram et al. | 370/468 |
| 2008/0098006 A1* | 4/2008 | Pedersen et al. | 707/10 |
| 2008/0119207 A1* | 5/2008 | Harris | 455/456.3 |
| 2008/0184128 A1 | 7/2008 | Swenson et al. | |
| 2008/0189468 A1 | 8/2008 | Schmidt et al. | |
| 2008/0244743 A1 | 10/2008 | Largman et al. | |
| 2009/0024853 A1* | 1/2009 | Yeap | H04L 63/0428 713/182 |
| 2009/0055693 A1 | 2/2009 | Budko et al. | |
| 2009/0083376 A1 | 3/2009 | Dowlmg et al. | |
| 2009/0216975 A1 | 8/2009 | Halperin et al. | |
| 2009/0248869 A1* | 10/2009 | Ghostine | 709/225 |
| 2009/0276771 A1 | 11/2009 | Nickolov et al. | |
| 2009/0288084 A1 | 11/2009 | Astete et al. | |
| 2010/0058347 A1 | 3/2010 | Smith et al. | |
| 2010/0107225 A1 | 4/2010 | Spencer et al. | |
| 2010/0110919 A1 | 5/2010 | Hischke et al. | |
| 2010/0121975 A1* | 5/2010 | Sinha et al. | 709/231 |
| 2010/0153955 A1 | 6/2010 | Sirota et al. | |
| 2010/0180293 A1 | 7/2010 | Brown et al. | |
| 2010/0198972 A1* | 8/2010 | Umbehocker | 709/226 |
| 2010/0218106 A1 | 8/2010 | Chen et al. | |
| 2011/0004649 A1* | 1/2011 | Nord et al. | 709/202 |
| 2011/0022812 A1* | 1/2011 | van der Linden et al. | 711/163 |
| 2011/0053513 A1 | 3/2011 | Papakostas et al. | |
| 2011/0184993 A1 | 7/2011 | Chawla et al. | |
| 2011/0191492 A1 | 8/2011 | Imai | |
| 2011/0225578 A1 | 9/2011 | Lauwers et al. | |
| 2011/0231844 A1 | 9/2011 | Ben-Shaul et al. | |
| 2011/0252071 A1 | 10/2011 | Cidon | |
| 2011/0292792 A1 | 12/2011 | Zuo et al. | |
| 2012/0072762 A1 | 3/2012 | Atchison et al. | |
| 2012/0089572 A1 | 4/2012 | Raichstein et al. | |
| 2012/0124194 A1 | 5/2012 | Shouraboura | |
| 2012/0131129 A1 | 5/2012 | Agarwal et al. | |
| 2012/0143944 A1 | 6/2012 | Reeves et al. | |
| 2012/0166967 A1 | 6/2012 | Deimbacher et al. | |
| 2012/0216015 A1 | 8/2012 | Mitra | |
| 2012/0239792 A1 | 9/2012 | Banerjee et al. | |
| 2012/0260248 A1 | 10/2012 | Katiyar et al. | |
| 2012/0297181 A1 | 11/2012 | Lee | |
| 2012/0304168 A1 | 11/2012 | Raj Seeniraj et al. | |
| 2012/0317295 A1 | 12/2012 | Baird et al. | |
| 2012/0331406 A1 | 12/2012 | Baird et al. | |
| 2013/0006808 A1 | 1/2013 | Kassaei | |
| 2013/0013738 A1 | 1/2013 | Astete et al. | |
| 2013/0018939 A1 | 1/2013 | Chawla et al. | |
| 2013/0073703 A1 | 3/2013 | Das et al. | |
| 2013/0091334 A1 | 4/2013 | Yu et al. | |
| 2013/0097601 A1 | 4/2013 | Podvratnik et al. | |
| 2013/0198318 A1 | 8/2013 | Branson et al. | |
| 2013/0283289 A1 | 10/2013 | Adinarayan et al. | |
| 2013/0297680 A1 | 11/2013 | Smith et al. | |
| 2013/0318522 A1 | 11/2013 | Devireddy et al. | |
| 2013/0326515 A1 | 12/2013 | Hara et al. | |
| 2014/0149490 A1* | 5/2014 | Luxenberg et al. | 709/203 |
| 2014/0207835 A1* | 7/2014 | Jellick | H04L 41/082 707/827 |
| 2014/0237070 A1* | 8/2014 | Choi et al. | 709/216 |
| 2014/0258155 A1 | 9/2014 | Suryanarayanan | |
| 2014/0258374 A1 | 9/2014 | Suryanarayanan | |
| 2014/0351822 A1 | 11/2014 | Jandir et al. | |
| 2014/0359613 A1 | 12/2014 | Tsirkin | |
| 2015/0019704 A1 | 1/2015 | Suryanarayanan | |
| 2015/0019705 A1 | 1/2015 | Suryanarayanan | |
| 2015/0019728 A1 | 1/2015 | Suryanarayanan | |
| 2015/0019733 A1 | 1/2015 | Suryanarayanan | |

FOREIGN PATENT DOCUMENTS

| | | |
|---|---|---|
| WO | WO 2014/164076 | 10/2014 |
| WO | WO 2014/164119 | 10/2014 |
| WO | WO 2014/210169 | 12/2014 |
| WO | WO 2014/210172 | 12/2014 |
| WO | WO 2014/210187 | 12/2014 |

OTHER PUBLICATIONS

How Virtual Desktops Work, available at http://www.turnkeydesk.com/how-virtual-desktops-work.php, last accessed on Mar. 29, 2013.
Hosted Virtual Desktop /Desktop Virtualization/Cloud My Office, available at http://www.cloudmyoffice.com/hosted-virtual-desktop-features, last accessed on Mar. 29, 2013.
U.S. Appl. No. 13/246,662, filed Sep. 27, 2011, titled "User Agent Information Management", in 66 pages.
U.S. Appl. No. 13/794,490, filed Mar. 11, 2013, titled "Automated Desktop Placement", in 76 pages.
U.S. Appl. No. 13/794,600, filed Mar. 11, 2013, titled "Application Marketplace for Virtual Desktops", in 76 pages.
U.S. Appl. No. 13/794,595, filed Mar. 11, 2013, titled "Automated Data Center Selection", in 77 pages.
U.S. Appl. No. 13/794,515, filed Mar. 11, 2013, titled "Automated Data Synchronization", in 77 pages.
U.S. Appl. No. 13/928,284, filed Jun. 26, 2013, titled "Management of Computing Sessions", in 50 pages.
U.S. Appl. No. 13/928,295, filed Jun. 26, 2013, titled Management of Computing Sessions, in 51 pages.
U.S. Appl. No. 13/928,290, filed Jun. 26, 2013, titled Management of Computing Sessions, in 50 pages.
U.S. Appl. No. 13/928,286, filed Jun. 26, 2013, titled Management of Computing Sessions , in 50 pages.
U.S. Appl. No. 13/928,278, filed Jun. 26, 2013, titled Management of Computing Sessions, in 51 pages.
U.S. Appl. No. 13/928,283, filed Jun. 26, 2013, titled Management of Computing Sessions, in 51 pages.
PCT International Search Report and Written Opinion, re PCT Application No. PCT/US2014/020655, mailed Jul. 24, 2014.
PCT International Search Report and Written Opinion, re PCT Application No. PCT/US2014/020404, mailed Jul. 18, 2014.
PCT International Search Report and Written Opinion, re PCT Application No. PCT/US2014/020412, mailed Jul. 18, 2014.
PCT International Search Report and Written Opinion, re PCT Application No. PCT/US14/44121, mailed Nov. 14, 2014.
PCT International Search Report and Written Opinion, re PCT Application No. PCT/US14/44124, mailed Oct. 30, 2014.
PCT International Search Report and Written Opinion, re PCT Application No. PCT/US14/44117, mailed Oct. 31, 2014.
PCT International Search Report and Written Opinion, re PCT Application No. PCT/14/44137, mailed Oct. 14, 2014.
PCT International Search Report and Written Opinion, re PCT Application No. PCT/14/44131, mailed Oct. 14, 2014.
PCT International Preliminary Report and Written Opinion, re PCT Application No. PCT/US2014/020655, issued Sep. 15, 2015.
PCT International Preliminary Report and Written Opinion, re PCT Application No. PCT/US2014/020404, issued Sep. 15, 2015.
PCT International Preliminary Report and Written Opinion, re PCT Application No. PCT/US2014/020412, issued Sep. 15, 2015.

* cited by examiner

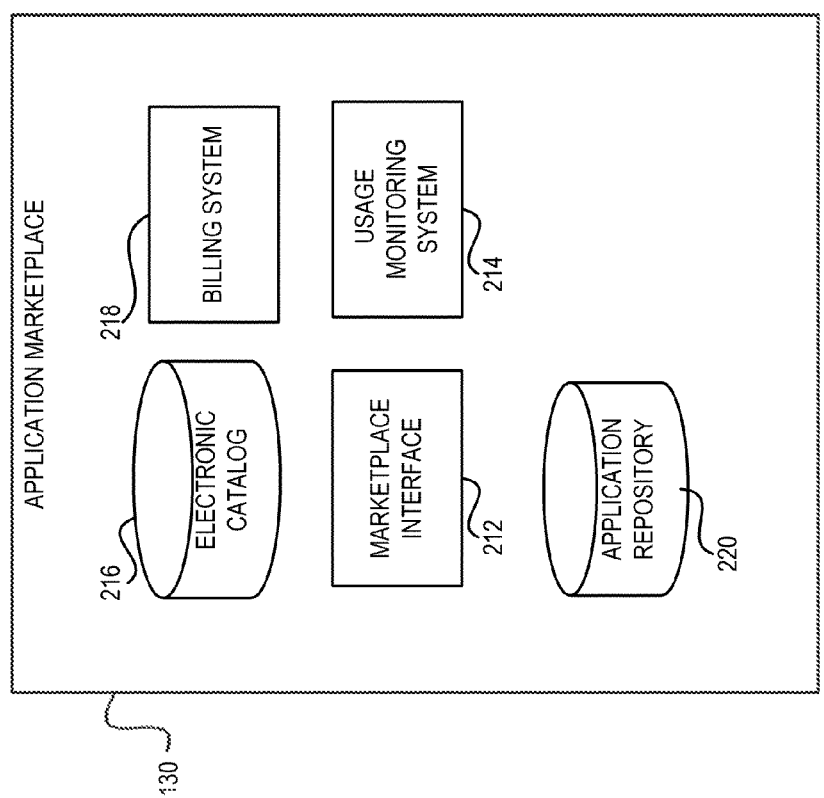

AUTOMATED DESKTOP PLACEMENT

RELATED APPLICATIONS

This application is a continuation of U.S. application Ser. No. 13/794,490, filed Mar. 11, 2013, and titled "AUTOMATED DESKTOP PLACEMENT," which is hereby incorporated by reference in its entirety, and which is related to the following applications that were all filed on the same day as U.S. application Ser. No. 13/794,490 and the disclosures of which are incorporated in their entirety by reference herein: U.S. application Ser. No. 13/794,600, filed Mar. 11, 2013, and titled "APPLICATION MARKETPLACE FOR VIRTUAL DESKTOPS"; U.S. application Ser. No. 13/794,595, filed Mar. 11, 2013, and titled "AUTOMATED DATA CENTER SELECTION"; and U.S. application Ser. No. 13/794,515, filed Mar. 11, 2013, and titled "AUTOMATED DATA SYNCHRONIZATION."

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers may house significant numbers of interconnected computing systems, such as, e.g., private data centers operated by a single organization and public data centers operated by third parties to provide computing resources to customers. Public and private data centers may provide network access, power, hardware resources (e.g., computing and storage), and secure installation facilities for hardware owned by the data center, an organization, or by other customers. A number of data centers may be further organized as part of a single Program Execution Service (PES) that can facilitate the utilization of resources of the data centers by customers of the PES.

To facilitate increased utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an as "requested" basis.

As the scale and scope of data centers has increased, the task of provisioning, administering, and managing the physical and virtual computing resources of the data center has become increasingly complicated.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

FIG. 2 illustrates an example of an application marketplace that, in some embodiments, can be included as part of a program execution service environment.

DETAILED DESCRIPTION

I. Introduction

In a traditional desktop computing environment, a user typically accesses the computing or storage resources of a desktop computer that is physically located near the desk of the user. The desktop computer can be connected to a display and data input device (e.g., keyboard and mouse) that allows the user to access applications that can be executed by the desktop computer (e.g., a word processing application, an electronic mail application, etc.). A laptop computing environment is generally similar to a desktop computing environment, except a portable laptop computer is used instead of the desktop computer. Disadvantages of the traditional desktop or laptop computing environments include the user being able to access only the applications that are stored on the desktop or laptop computer and inability to easily share applications or data across the different computing platforms. With the increased use of a wide range of both fixed and portable computing devices (e.g., desktops, laptops, tablets, smartphones, electronic book readers, etc.), a user may desire to access the same applications and data on each of these platforms. For example, a user may wish to use a word processing application to edit a document on the user's desktop computer located in the user's office. The user may then wish to continue to edit the document on the user's laptop in an airport while waiting for an airline connection. Then, while on the airplane or in a taxicab to a meeting, the user may wish to view or edit the document on a smartphone. In all these situations (or others), the user may wish to use the same word processing application, seamlessly edit the same document, and have a similar user experience when interacting with each computing device (subject to the computational and physical constraints of each device). In short, the user may wish to have a "virtual desktop" that allows the user access to the user's applications and data wherever the user is and on whatever computing device the user is using at that moment.

This application describes examples of systems and methods by which a user can achieve access to applications and data across a wide range of computing devices by using a connection to a program execution service (sometimes called a "cloud computing" service) that hosts the applications and the data rather than by the user accessing individual applications and data stored on each individual computing device. In various implementations, the program execution service can provide an application marketplace where users can buy or rent applications to use on their computing devices. The program execution service can also provide data storage that allows a user to access data that is synchronized automatically across all of the user's computing devices. Detailed examples of various cloud-based implementations will now be described.

Figure 1A:
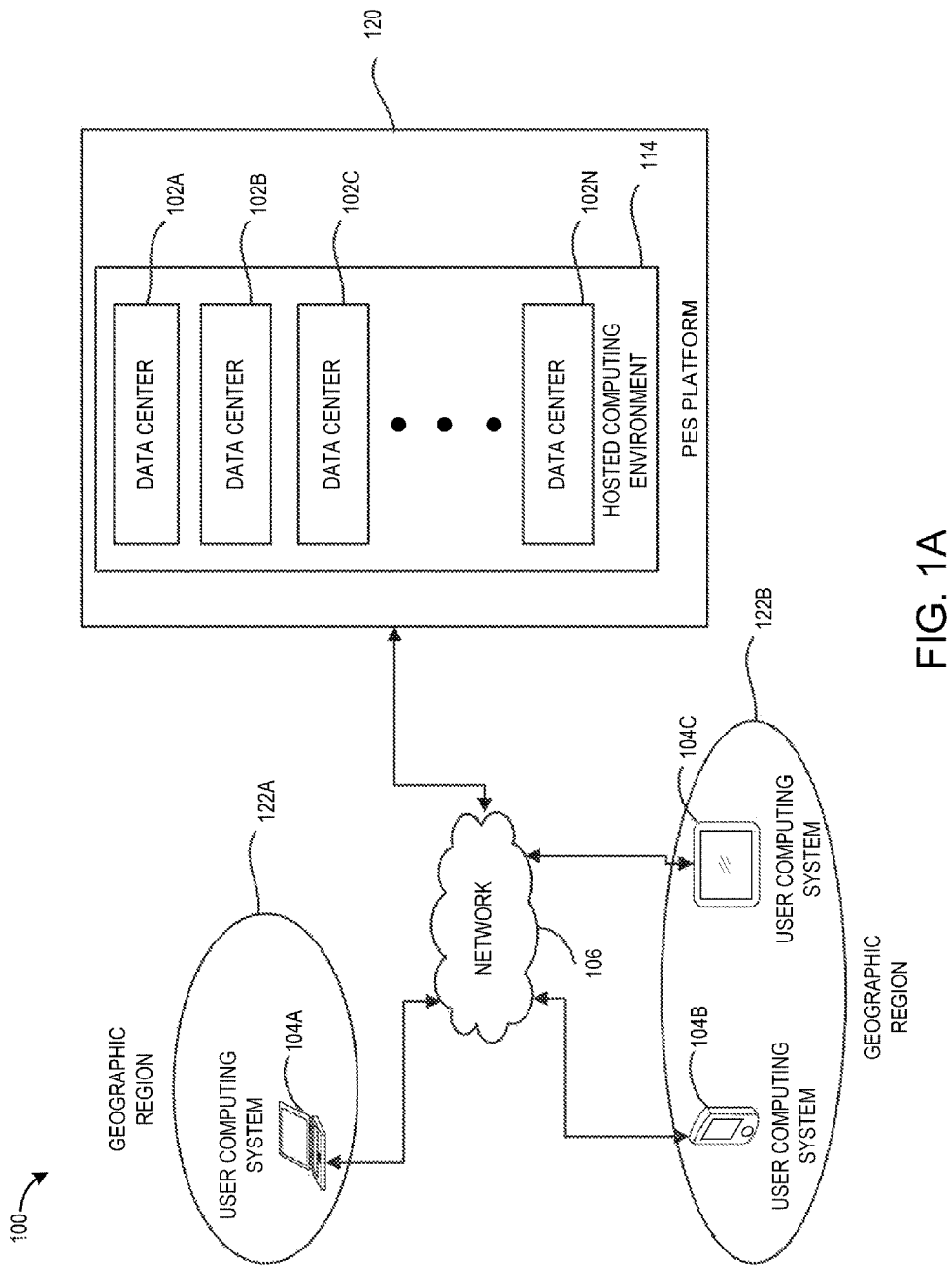
FIG. 1A illustrates an example of a program execution service environment that can provide computing resources to multiple user computing systems via a communication network.

Embodiments of systems and methods are described herein for providing access to computing resources hosted or made available by computer systems of data centers included as part of a Program Execution Service (PES). FIG. 1A illustrates one example of a PES environment 100 that can provide computing resources to multiple user computing systems 104 via a communication network 106.

The PES environment 100 includes a PES platform 120 (which may be referred to as a PES 120) for providing on-demand access to computing resources, such as virtual machine instances, which can include an application and/or access to a virtual desktop environment. As will be described in greater detail below with respect to FIG. 9, the computing resources may be launched or otherwise instantiated based upon a set of desktop placement rules and/or a set of computing resource placement rules.

The PES platform 120 can provide computing resources for executing applications on a permanent or an as-needed basis. The computing resources provided by the PES platform 120 may include various types of resources, such as data processing resources, data storage resources, data communication resources, application resources, file management resources, user authentication resources, virtual desktop resource, and the like. Although not limited as such, the virtual desktop resource can include an interface for interacting with files and/or applications that are stored on and/or hosted by the PES platform 120 as opposed to being stored on and/or hosted by a user computing system 104 used to communicate with the PES platform 120. The virtual desktop resource can be associated with (or emulate) an operating system. For example, there can be a Windows virtual desktop configurable to execute Windows applications. The virtual desktop can enable a user to access services provided by the PES platform such as, e.g., applications, a file manager, and/or file storage.

In some cases, the virtual desktop may be or may appear identical to a desktop of a user computing system 104. For example, the virtual desktop may provide access to application resources available via the PES platform 120 and may provide file management capabilities for managing files stored at the PES platform 120 via a graphical interface. In some cases, the virtual desktop may be configured to provide access to a single resource, such as an application. In some cases, the virtual desktop is a graphical container that is accessible on a computing system of a data center 102. This container may be streamed to a user computing system 104 and may be associated with a file manager and file storage. Further, in some cases, the virtual desktop may be an application that is accessible on a user computing system 104 on the user computing system 104. In other cases, the virtual desktop may be accessed by establishing communication with a computing system of a data center 102, which can stream a graphical interface for the virtual desktop to the user computing system 104. Although the virtual desktop is typically not accessed via a browser, in some cases, the graphical interface to the virtual desktop may be presented via a web browser.

Each type of computing resource may be general-purpose or may be available in a number of specific configurations. For example, data processing resources may be available as virtual machine instances. In some cases, the computing resource may be a compute node with a virtual machine configured with an operating system. The compute node may be implemented on a physical computing device such as a server. The instances may be configured to execute applications, including Web servers, application servers, media servers, database servers, and the like. Data storage resources may include file storage devices, block storage devices, and the like. Application resources may include applications that are rented and/or purchased. Further, application resources may include applications that are hosted by the PES platform 120 during execution and/or that are streamed, temporarily or permanently, to a user computing system 104 during execution.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The PES platform 120 includes a hosted computing environment 114 that includes a number of data centers 102A-102N (which may be referred herein singularly as "a data center 102" or in the plural as the data centers 102"), which provide users or customers with access to the computing resources described above. Further examples of a hosted computing environment and data centers is given in U.S. Pat. No. 7,865,586, issued on Jan. 4, 2011 and entitled "Configuring Communications Between Computing Nodes" which is hereby incorporated by reference in its entirety. In some instances, a hosted computing environment may also be referred to as a cloud computing environment.

Although four data centers 102 are illustrated, the PES platform 120 may include any number of data centers, such as one data center, ten data centers, or fifty data centers. Further, although the data centers 102 are illustrated conceptually as part of a single hosted computing environment 114, the data centers 102 may be located in geographically disparate locations. For example, the data center 102A may be located within the geographic region 122A, the data centers 102B and 102C may be located within the geographic region 122B, and the data center 102N may be located within yet another geographic region not illustrated in FIG. 1A. As will be described below, the geographic regions 122A, 122B can be located in different cities, counties, or states or even in different countries.

The data centers 102 are facilities utilized to house and operate computer systems and associated components. For example, the data centers 102 typically include redundant and backup power, communications, cooling, and security systems. One illustrative configuration for a data center 102 that implements the concepts and technologies disclosed herein for providing users with access to various computing resources will be described below with respect to FIG. 3.

Customers and other users of the PES platform 120 may access the computing resources provided by the data centers 102 over a network 106. The network 106 can include any type of wired or wireless network including a wide-area network (WAN), a local-area network (LAN), a cellular network, and the like. Further, in some cases, the network 106 can include the Internet. Moreover, in some cases, the network 106 can include any other networking topology known that connects the data centers 102 to remote customers or users. It should also be appreciated that combinations of such networks might also be utilized.

As illustrated in FIG. 1A, the customers or users may communicate with the PES platform 120 via one or more user computing systems 104A-104C (which may be referred herein singularly as "user computing system 104" or in the plural as the user computing systems 104"). Although three user computing systems 104 are illustrated, the PES environment 100 may include any number of user computing systems 104. Further, the user computing systems 104 may include any type of computing system that may be utilized by a user to access the PES platform 120. For instance, the user computing system 104 may be a server computer, a desktop or laptop personal computer, a tablet computer, a wireless telephone (e.g., a smartphone), a personal digital assistant (PDA), an electronic book reader (e.g., an e-reader), a game console, a set-top box, or any other computing device capable of accessing the PES platform 120.

Each of the user computing systems 104 may be located in one or more disparate geographic regions 122A-122B. For example, as illustrated, the user computing system 104A may be located in the geographic region 122A and the user computing systems 104B and 104C may be located in the geographic regions 122B. As another example, each of the computing systems 104 may be located in its own geographic region 122 or located in the same geographic region 122.

Each geographic region 122 may be of varying size. For example a geographic region 122 may be a residence or building (e.g., a business, a corporate headquarters, or an airport). As a second example, a geographic region 122 may be a geographic area, such as a square mile. In some cases, a geographic region 122 may be based on geo-political boundaries. For example, the geographic region 122A may be a city, county, state, or country, and the geographic region 122B may be another city, county, state, or country. In some instances, a geographic region 122 may be defined based, at least in part, on networking equipment. For example, the geographic region 122A may be defined based on the range of a router (not shown) located in the geographic region 122A.

The user computing systems 104 may communicate with the PES platform 120, or the data centers 102 thereof, via the network 106. Communicating with the data centers 102 may include communicating with computer systems of the data centers 102. For example, a user computing system 104 may access a virtual desktop or an application hosted on a data center computing system. A number of connection protocols may be used to access the data center computing systems. For example, the user computing system 104 may communicate with a computer system at a data center using a Remote Desktop Protocol (RDP) based connection, or a User Datagram Protocol (UDP) based connection. Further, the user computing system 104 may access application instances hosted at the data center using any protocol for accessing or streaming an application hosted by another machine. For example, the user computing system 104 may access an application hosted on a data center computer by using application virtualization or application streaming software such as App-V (available from Microsoft Corporation, Redmond, Wash.) or ThinApp (available from VMware, Inc., Palo Alto, Calif.), A. Data Center Selection As previously mentioned, the user computing systems 104 may access the PES platform 120 to obtain access to various computing resources. Typically, communication with the PES platform 120 occurs by communicating with a single data center 102. Although in some cases a user computing system 104 may communicate with multiple data centers 102. To simplify discussion, and unless stated otherwise, the examples described herein will assume that the user computing system 104 is communicating at a given point in time with a single data center 102. However, at different points in time, a user computing system 104 may communicate with different data centers 102, particularly when the user computing system 104 has moved to a different geographic region 122 or is attempting to access a different computing resource.

In some cases, a user may select the data center 102 with which to communicate. The data center 102 selected by the user may often be sub-optimal. For example, the data center 102 selected by the user may not provide the lowest latency connection. Further, the data center 102 selected by the user may not include one or more computing resources that the user desires to access.

Embodiments of systems and methods are described herein for automatically selecting a data center 102 that can communicate with a user computing system 104 over a connection that provides reduced or minimal latency. In some cases, the latency of the connection may not be reduced or minimal compared to connections with other data centers at a given point in time, but may be reduced or minimal over a period of time. Further, in some instances, the selected data center 102 may not provide an absolute minimal latency connection, but may provide a latency connection that is below a latency threshold level. In some cases, the system can select the data center based on the calculation of one or more latency factors that correlate, at least in part, to the latency of a communication channel between the data center and the user computing system. Moreover, the selected data center 102 may be identified from a set of data centers 102 that include the one or more computing resources the user has identified as desiring to access.

In certain embodiments, the data center 102 may be selected by measuring a number of latency factors associated with a connection between the user computing system 104 and one or more of the data centers 102 from the hosted computing environment 114. For example, the data center 102 may be selected based on a geographic distance between the data centers 102 and the user computing system 104. Selecting a data center 102 is described further with respect to FIGS. 6 and 7 below.

B. Desktop Instance Placement

Communicating with a data center 102 may include communicating with one or more data center computers that provide access to computing resources, such as applications and virtual desktops. Entities that use a data center 102 to provide computing resources to a number of users (e.g., employees or customers) may, in some cases, desire to specify rules for how computing resources are distributed at a data center 102. For example, an entity that provides brokerage services may want to reduce the number of employees (or customers) impacted when a data center 102 computer system goes offline. As such, the entity may want to distribute its employees that handle the trading among a number of computer systems instead of aggregating the entire department in one or two data center 102 computer systems.

Embodiments of the present disclosure enable a user (e.g., an administrator) to provide rules for the placement and/or configuration of computing resources (e.g., virtual desktops) at a data center 102 for an entity that employs or is associated with the user. The data center 102 can use the placement rules to select a data center computer system to host computing resources for a user. For example, the data center 102 can determine that a user is a member of the accounting department of an engineering company. Based on rules specified by an administrator at the engineering company, the data center 102 can select a data center computer that is not hosting other members of the company's accounting department. Further, the data center 102 can ensure that a virtual desktop created for the accounting department employee is preconfigured with the applications required for the account department employee to perform his or her job functions.

C. Application Access

A user of a program execution service (PES) may choose among a variety of applications and operating systems that are available through the application marketplace. The user may search for the operating system and applications she wants to use on her virtual desktop instance. The PES platform 120 may configure the applications to be executable from the virtual desktop instance running the operating system chosen by the user. For example, the user may choose to install an Apple MAC OS on her virtual desktop instance. She may also choose to include the Microsoft PowerPoint software in her virtual desktop instance. The user may initially access the PowerPoint software from the user's laptop computer at home. The user may then travel to another city, where the user wants to access the same software and operating system environment from the user's laptop computer at the user's hotel, using a connection with the virtual desktop instance on the PES platform 120. The PES platform 120 may check metadata associated with the user and the user's laptop computer, and determine that the user is authorized to access the program.

The user may then travel to a business meeting and conduct a presentation from the user's tablet device. The PES platform 120 may check the metadata associated with the user and the user's tablet device and determine that the user is authorized to access the PowerPoint software on the virtual desktop instance on the PES platform 120 from the user's tablet device.

D. Cloud Folder Synchronization

Many people have more than one computing device. Users may want to access files stored remotely on the PES platform 120 from a number of different devices, such as a desktop computer, a server computer, a table device, a smartphone, etc. While a user may access the file on these devices, in some embodiments, security and access level settings may be configured to only allow the user to synchronize a file on certain devices. Once a file is allowed to be synchronized on a computing device, all the changes made to the file from other computing devices or on the virtual desktop instance can be automatically synchronized to the computing device. In some instances, a file may be configured to be accessible on a computing device regardless of network connectivity.

For example, a user may have a desktop PC in her office, a tablet device, and a smartphone, which are all configured to access files stored on the PES platform 120. The user may work on a Microsoft Word® document on her desktop PC through the virtual desktop instance hosted on the PES platform 120. After editing the Microsoft Word document on the virtual desktop instance, the user may turn off her desktop PC in her office. The user may arrive at an airport and desire to edit the same Microsoft Word document.

There may be many synchronization points between the various computing devices of a user. Consider the following illustrative example, in which a user Bob has a virtual desktop instance Foo. Files modified by Bob using the virtual desktop instance Foo may be synchronized with one of Bob's computing devices, for example, computing device 0. Files modified by Bob using the virtual desktop instance Foo on his computing device 0 may also be synchronized with the PES so that the PES stores a copy of the modified files in file storage accessible by Bob (e.g., in a folder Foo accessible by the virtual desktop Foo). User Bob may then choose to access one or more of the files stored by the PES but using a second computing device, for example computing device 1. The computing device 1 can access the files (e.g., from the folder Foo on the PES) so that Bob can continue to work on and modify the files on computing device 1 using the virtual desktop instance Foo on computing device 1. The PES can synchronize the files between file storage in the PES and local storage on computing device 1. Accordingly, files stored in the PES can be synchronized with both of Bob's computing devices 0 and 1. Thus, changes to the documents on either or both of computing devices 0 and 1 can be synchronized with the PES and with the virtual desktop instance Foo. Further, if network connectivity to the PES is lost, or local access is needed, user Bob has access to the file on both computing device 0 and computing device 1.

II. Example Program Execution Service Environment

Figure 1B:
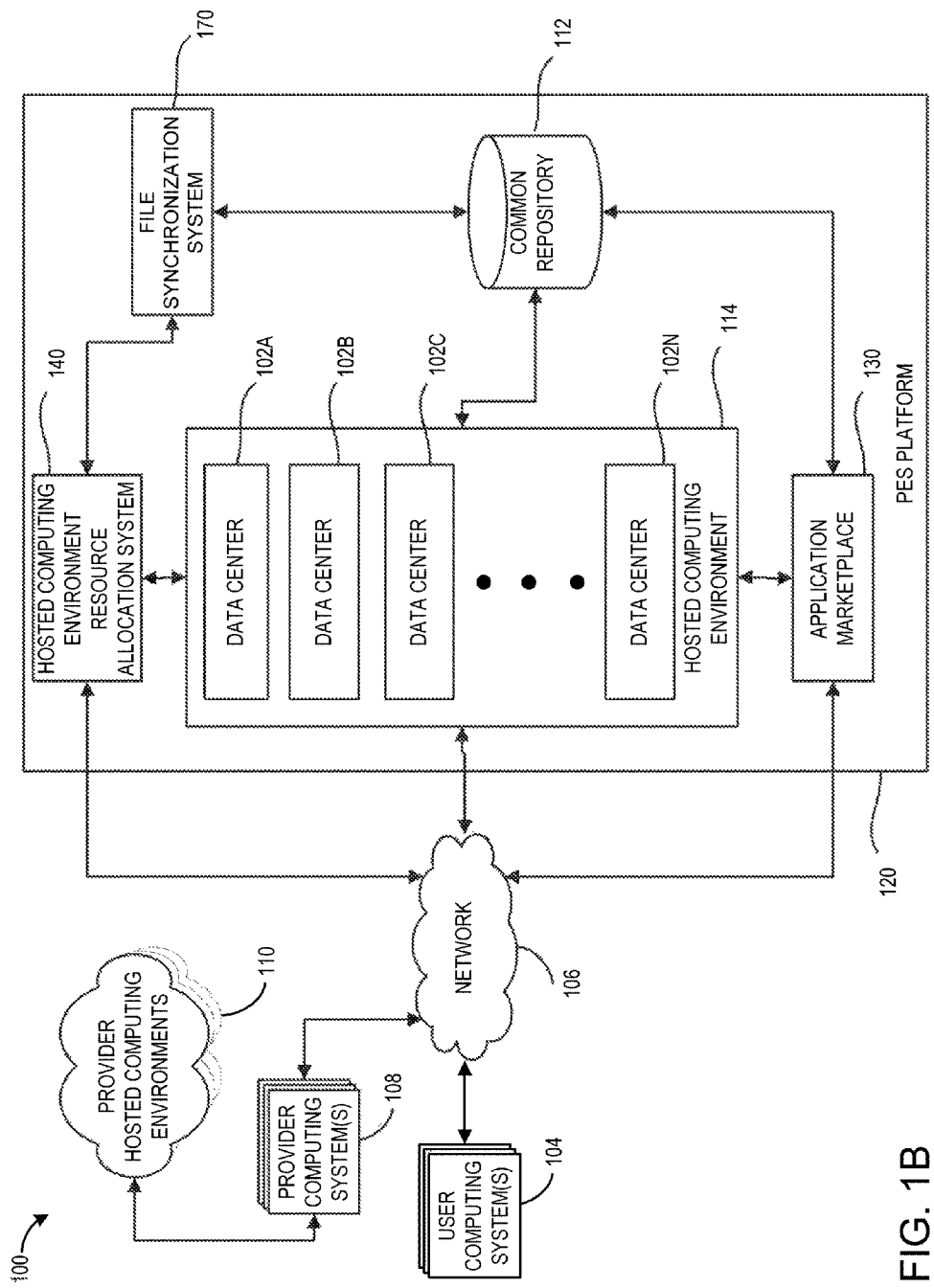
FIG. 1B illustrates a further example of the program execution service environment that can provide computing resources to multiple user computing systems via a communication network.

FIG. 1B illustrates a further example of the program execution service environment 100 that can provide computing resources to multiple user computing systems 104 via a communication network 106. In addition to the components illustrated in FIG. 1A, the program execution service environment 100 can include one or more provider computing systems 108 in communication with the PES platform 120 via the network 106.

A user of a provider computing system 108, may submit via the network 130 a service image for a specific type of functionality to an application marketplace 130, which is included as part of the PES platform 120 and is described in more detail below with respect to FIG. 2. The service image may include an image of an application, a virtual desktop configuration, or any other type of computing resource that may be made available via the application marketplace 130. The application marketplace 130 may make the submitted service image, as well as other service images submitted to the marketplace, available to users of the user computing systems 104. Accordingly, a user utilizing a user computing system 104 may browse the service images available from the application marketplace 130, acquire a desired service image, and launch the acquired service image at the user computing system 104 or in a computer system of a data center 102 as will be described further with respect to FIG. 10 below.

In some cases, the user of the provider computing system 108 may be affiliated with an entity that is affiliated with the PES platform 120. In other cases, the user of the provider computing system 108 may be a third-party that is not affiliated with the PES platform. In cases where the acquired service image was submitted to the electronic service image marketplace 100 by a third party provider, the acquired service image may be launched in a provider hosted computing environment 110 that is operated, maintained, provided or otherwise associated with the third party provider. The provider hosted computing environment 110 may include one or more physical computer systems and, in some cases, may itself be a PES platform.

The PES platform 120 may further include a hosted computing environment resource allocation system 140, which may include any system that can facilitate selecting a data center 102 from the hosted computing environment 114. The hosted computing environment resource allocation system 140 may select a data center 102 based on a number of factors including an expected latency of a connection between the data center 102 and a user computing system 104 and the computing resources available at the data center 102.

To facilitate selecting the data center 102, in some cases, the hosted computing environment resource allocation system 140 can access metadata associated with the data centers 102 from the common repository 112. This metadata can include any information that may be associated with a data center 102. For example, the metadata can include the data center's 102 location, the computing resources available at the data center 102, latency information for connections between the data center 102 and various geographic regions 122, the identity of entities that have access to the data center 102, access rules for determining whether a user or associated entity is authorized to access the data center 102, and the like.

In some instances, a user may want to synchronize data between a user computing system 104 and a data center 102. Further, if a user accesses a new data center 102, because, for example, the user switches geographic locations, it may be necessary to synchronize data between data centers 102. In such cases, the PES platform 120 may use a file synchronization system 170 to facilitate synchronizing data. The file synchronization system 170 is described in more detail below with respect to FIG. 11.

Although illustrated as part of the PES platform 120, in some instances, one or more of the hosted computing environment resource allocation system 140 and the application marketplace 130 may separate from the PES platform 120. Further, in some cases, one or more of the hosted computing environment resource allocation system 140 and the application marketplace may be included as part of the hosted computing environment 114. Moreover, in some cases, the common repository 112 may be included as part of the hosted computing environment 114.

III. Example Electronic Service Image Marketplace

FIG. 2 illustrates an example of an application marketplace 130 that, in some embodiments, can be included as part of a program execution service environment 100. As previously mentioned, the application marketplace can make available service images to users. These service images can include applications, virtual desktops, and other computing resources that are made available by an entity associated with the PES platform 120 or a third party entity.

In the illustrated embodiment, the application marketplace 130 is illustrated as a computer environment that can include several systems including an electronic catalog 216, a marketplace interface 212, an application repository 220, a billing system 218 and usage monitoring system 214. In some cases, the systems of the application marketplace 130 may be part of a single computing system. In other cases, at least some of the system of the application marketplace 130 may be distributed across multiple computer systems. In such cases, the computer systems may be interconnected using one or more networks, such as the network 106, or the like. Each of the systems of the application marketplace 130 will be described in more detail below. However, the application marketplace 130 could have fewer or a greater number of components than illustrated in FIG. 2. In addition, the application marketplace 130 could include various network or Web services and/or peer-to-peer network configurations. Thus, the depiction of the application marketplace 130 in FIG. 2 should be taken as illustrative and not limiting to the present disclosure.

The marketplace interface 212 facilitates network submission by third party providers, and browsing and acquisition by users or customers of service images in the application marketplace 130. Accordingly, a provider, or other user, utilizing a provider computing system 108, may submit one or more service images to the application marketplace 130 via the marketplace interface 212. The submitted service images may then be included in an electronic catalog 216. Embodiments or processes for submitting service images, such as applications, are described in more detail in U.S. application Ser. No. 13/248,227 filed on Sep. 29, 2011 and titled "Electronic Marketplace for Hosted Service Images," which is hereby incorporated by reference in its entirety herein.

The electronic catalog 216 includes information on service images available from a plurality of providers and on service images made available by the operator of the application marketplace 100, which may be the same operator as the operator of the PES platform 130. Accordingly, the marketplace system 212 may obtain service image information for service images offered by a plurality of providers and the marketplace and make the service images available to a customer from a single network resource, such as a Web site. A customer may then acquire the service image from the application marketplace and launch the service image in a hosted computing environment 114, or a data center 102 thereof, in a single interaction or order placed with the service image marketplace, or as part of multiple interactions with the PES platform 120. The electronic catalog 216 may be a catalog containing information regarding both items (such as goods and services) and service images (such as applications and virtual desktops), or may be separate catalogs, with one catalog containing information regarding items and the other catalog containing information regarding services images, without departing from the scope of the present disclosure.

Illustratively, marketplace interface 212 may generate one or more user interfaces through which a customer, utilizing a user computing system 104, may browse service images (e.g., applications or virtual desktops), submit queries for matching service images and view information and details regarding specific service images.

After the customer selects a desired service image from the application marketplace 130, the marketplace interface 212 may facilitate the configuration and acquisition of the service image and cause the launching of the service image on a computer system at a data center 102. In this regard, the marketplace interface 212 may receive payment information from the user computing system 104, as well as, in some cases, information specifying how the service image should be implemented on the computer system at the data center 102. In some embodiments, the customer may select a specific data center 102 to host the selected service image.

Once the service image is launched and running on a computer system at a data center 102, the application marketplace 130 can monitor the usage of functionality or services provided by the service image via the usage monitoring system 214. Further, the application marketplace 130 can bill the customer and/or pay the service image provider accordingly via the billing system 218. The billing system 218 may receive and provide payment information via interaction with the marketplace system 212. In some embodiments, the billing system 218 may alternatively receive and provide payment information via other processes, such as via an additional server, via telephonic interaction, or other mechanisms. Moreover, the application marketplace 130 may provide the customer with tools to manage, monitor, modify, etc. the configuration of the service image.

The service images may be stored at an application repository 220. When a user purchases, rents, licenses, or obtains access to a service image, such as an application or preconfigured virtual desktop, the application marketplace 130 may access the application repository to obtain a copy of the service image and can install it on a computer system at a data center 102 that has been selected using the processes described herein.

In some embodiments, the provider of an application may provide rules to the application marketplace 130 restricting deployment or purchase of a provided application. For example, the provider may restrict deployment of an application to data centers 102 located in the same country as the provider. The provider may specify the territorial rule to ensure compliance with export restriction laws of the provider's country. As another example, the provider may restrict deployment of the application to data centers 102 that an entity associated with the provider has purchased access. For instance, if the application was developed only for employee use, the provider may specify that the application should be limited to data centers 102 that employees can access.

IV. Example Data Center

Figure 3:
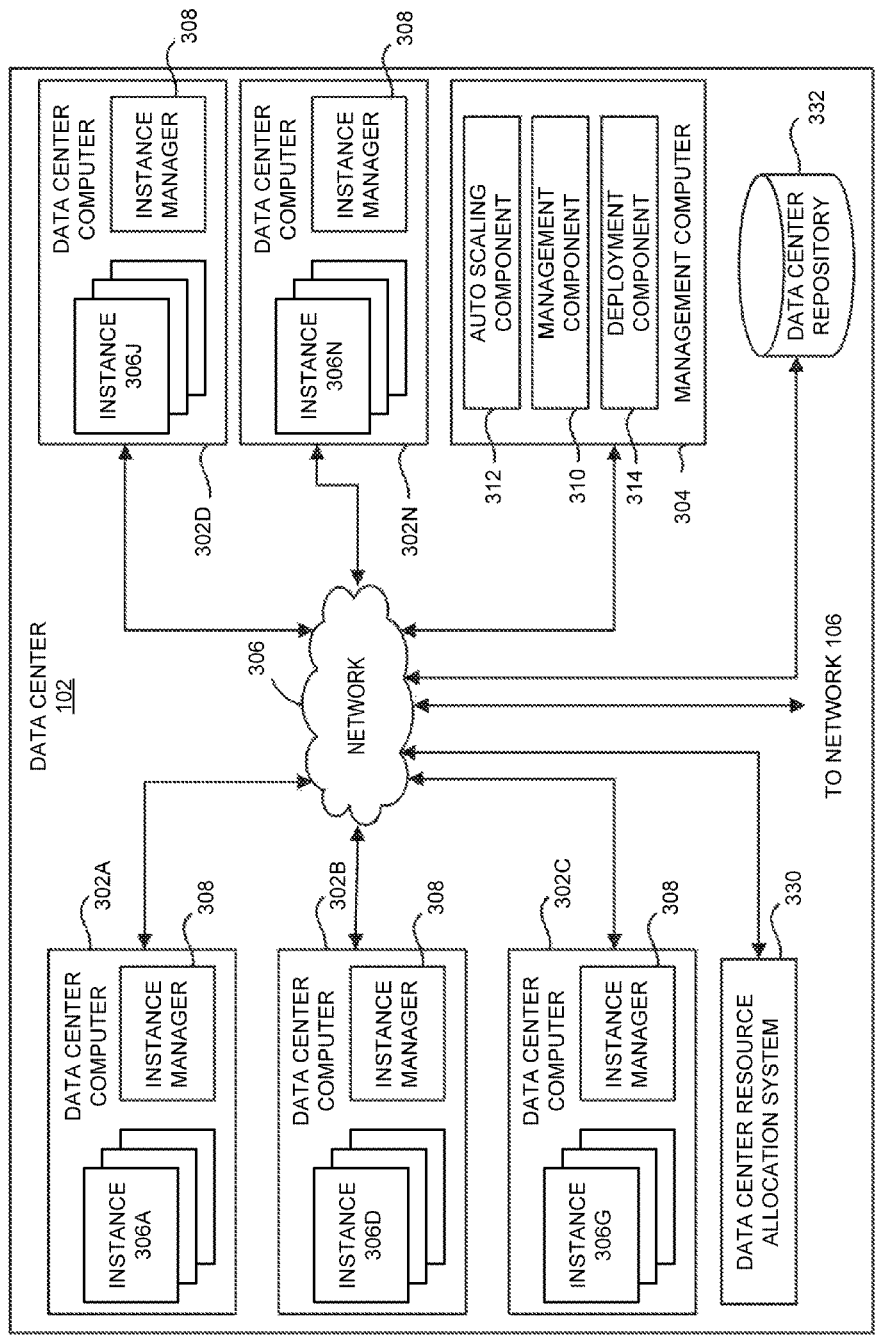
FIG. 3 illustrates an example of a data center that, in some embodiments, can be included as part of a program execution service environment.

FIG. 3 illustrates an example of a data center 102 that, in some embodiments, can be included as part of a program execution service environment 100. As previously described, the data center 102 may be part of a hosted computing environment 114 and may include a collection of rapidly provisioned and released computing resources hosted in connection with the application marketplace 130 or a third party provider. The computing resources may include a number of computing, networking and storage devices in communication with one another. In some embodiments, the computing devices may correspond to physical computing devices (e.g., the data center computers 302). In other embodiments, the computing devices may correspond to virtual machine instances (e.g., the instances 306) implemented by the one or more physical computing devices. In still other embodiments, computing devices may correspond to both virtual computing devices and physical computing devices.

The example data center 102 shown in FIG. 3 includes several data center computers 302A-302N (which may be referred herein singularly as "a data center computer 302" or in the plural as the data center computers 302") for providing computing resources for executing an application. The data center computers 302 may be any type of computing device including client computer systems and tower or rack-mount server computers configured appropriately for providing the computing resources described above. For instance, in one implementation the data center computers 302 are configured to provide instances 306A-306N of computing resources.

In one embodiment, the instances 306A-306N (which may be referred herein singularly as an instance 306" or in the plural as the instances 306") are virtual machine instances. In certain embodiments, the instances 306 may be based on, or may be instances of, the service images made available by an entity associated with the PES platform 120 or a third party entity as described herein. A virtual machine instance may include an instance of a software implementation of a machine (e.g., a computer) that executes programs like a physical machine. In the example of virtual machine instances, each of the data center computers 302 may be configured to execute an instance manager 308 capable of executing the instances. The instance manager 308 might be a hypervisor or another type of program configured to enable the execution of multiple instances 306 on a single data center computer 302, for example. Each of the instances 306 may be configured to execute all or a portion of an application. Further, in some cases, the instance 306 may be configured to provide access to a virtual desktop environment.

It should be appreciated that, although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

The data center 102 shown in FIG. 3 also includes a management computer 304 that can execute software or hardware components for managing the operation of the data center 102 including, in some cases, the data center computers 302 and/or the instances 306. In particular, the management computer 304 might execute a management component 310. In some cases, a user (e.g., an administrator) of the PES platform 120 might utilize the user computing system 104 to access the management component 310 to configure various aspects of the operation of a data center 102 and the instances 206 purchased by a customer. In some cases, a customer (e.g., an administrator of an enterprise customer) may access the management component 310 to configure purchased or rented portions of the data center 102. For example, the customer may purchase instances and make changes to the configuration of the instances or, as described further below, supply placement rules for allocating computer resources at the data center 102 to additional users (e.g., additional employees of the enterprise customer). The customer might also specify settings regarding how the purchased instances are to be scaled in response to demand. Further, the customer might also provide requests to launch instances to the management component 310. In some embodiments, a user may have no knowledge regarding the functionality and/or management of the data center 102. In such cases, the data center 102, using for example the management component 310, may automatically configure computing resources of the data center 102 for use by the user.

The management computer 304 may further include an auto scaling component 312 that can scale the instances 306 based upon rules defined by a user (e.g., an administrator) of the PES platform 108. In one embodiment, for instance, the auto scaling component 312 allows the user to specify scale up rules for use in determining when new instances should be instantiated and scale down rules for use in determining when existing instances should be terminated. In some embodiments, the scale up and scale down rules may be based on data center 102 utilization, quality of service guarantees, time of day, and/or the customers provided with access to the data center 102, to name a few.

In some cases, the auto scaling component 312 may execute on a single management computer 304 or in parallel across multiple computers in the data center 102 and/or the PES platform 120. In addition, the auto scaling component 312 may consist of a number of subcomponents executing on different data center 302 or other computing devices in the PES platform 120. The auto scaling component 312 may be implemented as software, hardware, or any combination of the two. In some cases, the auto scaling component 312 may facilitate monitoring available computing resources in the PES platform 120 over an internal management network, for example. Alternatively, or in addition, the available computing resources may be monitored by the data center resource allocation system 330.

The management computer 304 may also include a deployment component 314 to assist with the deployment of new instances 306 of computing resources. The deployment component 314 may receive a configuration from a user or system that includes data describing how new instances 306 should be configured. For example, assuming the new instance 306A is for a virtual desktop, the configuration might specify one or more applications that should be installed with the new instance 306A or accessible by the virtual desktop of the instance 306A.

Further, the deployment component 314 may provide scripts and/or other types of code to be executed for configuring new instances 306, provide cache warming logic specifying how an application cache should be prepared, and other types of information that can facilitate creating an instance 306. In some cases, the configuration, cache warming logic, and other information may be specified by a user utilizing the management component 310 or by providing this information directly to the deployment component 314. Other mechanisms might also be utilized to configure the operation of the deployment component 314.

In some embodiments, the data center 102 includes a data center resource allocation system 330, which may include any system that can facilitate selecting a data center computer 302 to provide a user with access to a computing resource. The data center resource allocation system 330 may select a data center computer 302 based on a number of factors including load on the data center computer 302, resources available on the data center computer 302, the type of computing resource requested, metadata associated with requesting user, and the like. In some cases, the data center resource allocation system 330 may select a data center based on instance or computing resource placement rules provided by the user and/or administrator associated with an entity of which the user is associated. These computing resource placement rules can include any factor that can be used to determine where to place an instance 306 to enable a user to access a computing resource. The computing resource placement rules and the selection of a data center computer are discussed in more detail below with respect to FIGS. 8 and 9.

The computing resource placement rules and/or attributes or metadata associated with the data center 102 may be stored at the data center repository 332. The attributes or metadata associated with the data center 102 can include any information that can be associated with a data center. For example, the metadata can include information regarding physical resources available at the data center 102, software resources available at the data center 102, the location of the data center 102, identity of users and/or entities authorized to access the data center 102, latency information associated with the data center 102, and the like.

In the example data center 102 shown in FIG. 3, a network 306 is utilized to interconnect the data center computers 302A-302N, the management computer 304, the data center resource allocation system 330, and the data center repository 332. The network 306 may include any type of network as has previously been described with respect to the network 106, including a LAN. Further, the network 306 may also be connected to the network 106 illustrated in FIGS. 1A and 1B. It should be appreciated that the network topology illustrated in FIGS. 1A, 1B, and 3 have been greatly simplified and that many more networks and networking devices may be utilized to interconnect the various computing systems disclosed herein. Appropriate load balancing devices or software modules might also be utilized for balancing a load between each of the data centers 102A-102N, between each of the data center computers 302A-302N in each data center 102, and between instances 306 purchased or rented by each customer of the PES platform 120.

It should be appreciated that the data center 102 described in FIG. 3 is merely illustrative and that other implementations might be utilized. In particular, functionality described herein as being performed by the management component 310, the auto scaling component 312, and the deployment component 314 might be performed by one another, might be performed by other components, or might be performed by a combination of these or other components. Further, functionality described as being performed by the data center resource allocation system 330 may be performed by one or more components of the management computer 304 or vice versa. In addition, in some cases, the data center resource allocation system 330 may be included as part of the management computer 304, or vice versa. Additionally, it should be appreciated that various components of the data center 102 may be implemented in software, hardware, or a combination of software and hardware.

V. Example Resource Allocation stem

Figure 4:
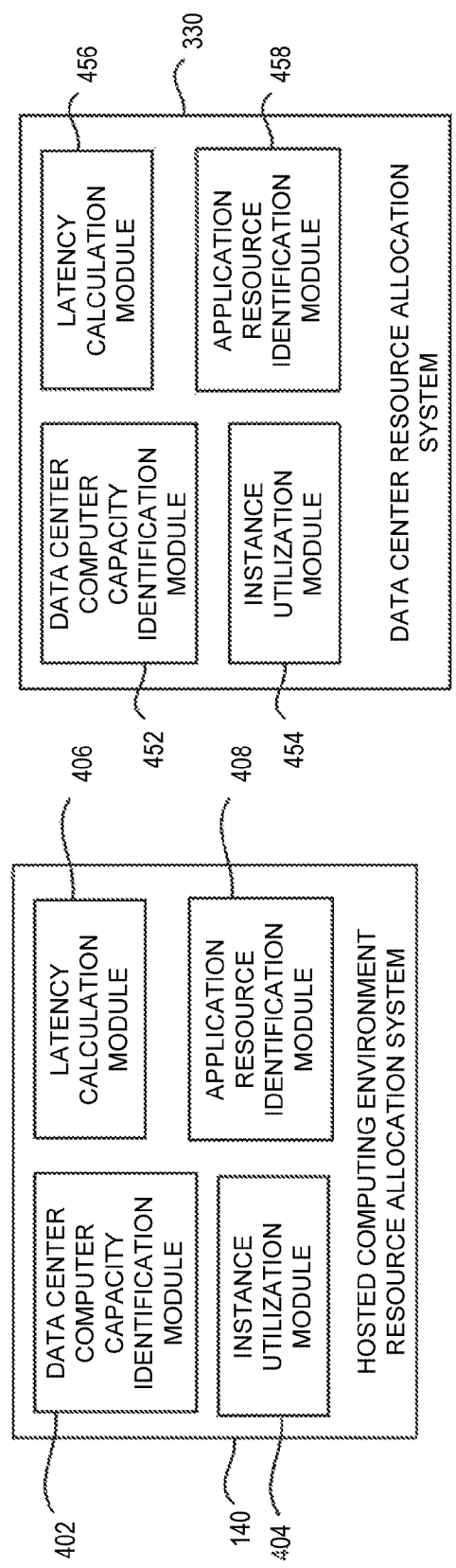
FIG. 4A illustrates an example of a hosted computing environment resource allocation system that, in some embodiments, can be included as part of a program execution service environment.
FIG. 4B illustrates an example of a data center resource allocation system that, in some embodiments, can be included as part of a data center.

FIG. 4A illustrates an example of a hosted computing environment resource allocation system 140 that, in some embodiments, can be included as part of a program execution service environment 100. As previously described, the hosted computing environment resource allocation system 140 can include any system for facilitating selection of a data center 102 from the hosted computing environment 114. The hosted computing environment resource allocation system 140 can include a number of subsystems that can be used to help identify a data center 102. These subsystems can include a data center computer capacity identification module 402, an instance utilization module 404, a latency calculation module 406, and an application resource identification module 408.

Using the data center computer capacity identification module 402, the hosted computing environment resource allocation system 140 can identify capacity information related to the capacity of data center computers 302 at each data center 102. The capacity can refer to physical resources associated with the data center computers 302, such as processor, memory, and storage resources, or software resources, such as applications or virtual machine capacity. Further, the information determined by the data center computer capacity identification module 402 can include any information associated with the capacity of the data center computers 302. For example, the data center capacity information can include the total capacity supported by the data center computers 302 or a data center 102, the capacity used and/or available at the data center 102, the types of data center computers 302 available at the data center 102, etc.

In some embodiments, the hosted computing environment resource allocation system 140 can identify the capacity information of the data center computers 302 by accessing the data center resource allocation system 330. Alternatively, or in addition, the hosted computing environment resource allocation system 140 may access the common repository 112 to determine capacity information of the data centers 102.

The instance utilization module 404 can identify the amount of instances 302 utilized and/or available at a data center 102. In some cases, the number of instances 302 that may be supported by a data center 102 is unlimited. In other cases, the number of instances 302 that may be supported by the data center 102 is based on computing resources available (e.g., processors or memory of the data center computers 302) and/or administrator settings of the data center computers 302. Similar to the data center computer capacity identification module, in some cases the instance utilization module 404 may access one or more of the data center resource allocation system 330 of a data center 102 and the common repository 112 to determine the utilization of instances 306 at a data center 102. In some embodiments, the instance utilization module 404 may be included as part of the data center computer capacity identification module 402.

The application resource identification module 408 can identify applications or service images available at a data center 102 by accessing the data center resource allocation system 330 and/or the common repository 112. In some embodiments, particular applications may be restricted from a subset of data centers 102. For example, an application provider may desire to limit the data centers 102 that can provide access to the application for, e.g., cost reasons or to keep the application from violating export laws. In some cases, a data center 102 may have access to a limited number of licenses for an application. In such cases, the application resource identification module 408 can identify whether licenses are available for the application. In some embodiments, the application resource identification module 408 may be included as part of the data center capacity identification module 402 and/or the instance utilization module 404.

In certain cases, it is important to have as small of latency as possible in communicating with a data center 102 is important. The latency calculation module 406 can calculate an estimated latency between a data center 102 and a user computing system 104 thereby optimizing a data center selection for minimal latency. Processes for selecting a data center 102 and calculating an expected latency are described further below with respect to FIGS. 6 and 7.

VI. Example Data Center Resource Allocation SyStem

FIG. 4B illustrates an example of a data center resource allocation system 330 that, in some embodiments, can be included as part of a data center 102. In some instances, each data center 102 may include its own data center resource allocation system 330 that can communicate with the hosted computing environment resource allocation system 140 of the PES platform 120.

As can be seen by comparing FIG. 4B with FIG. 4A, the data center resource allocation system 330 can include similar systems as the hosted computing environment resource allocation system 140. In some embodiments, the systems of the hosted computing environment resource allocation system 140 may facilitate identifying the availability of resources within the PES platform 120 while the data center resource allocation system 330 may facilitate identifying the availability of resources within a particular data center 102 that includes the data center resource allocation system 330.

In some instances, the data center resource allocation system 330 can include a data center computer capacity identification module 452, an instance utilization module 454, a latency calculation module 456, and an application resource identification module 458. In some cases, the systems of the data center resource allocation system 330 may provide information to the corresponding systems of the hosted computing environment resource allocation system 140 to facilitate determinations and/or calculations by the hosted computing environment resource allocation system 140.

Thus, for example, the data center computer capacity identification module 452 may provide capacity information for the data center computers 302 of the data center 102 to the data center computer capacity identification module 402 of the hosted computing environment resource allocation system 140. Likewise, the instance utilization module 454 may provide information regarding the utilization and/or availability of instances 306 of the data center 102 to the instance utilization module 404 of the hosted computing environment resource allocation system 140. Further, the application resource identification module 458 can provide information relating to the available applications at a data center 102 to the application resource identification module 408.

In addition to the systems described above, the data center resource allocation system 330 can also include a latency calculation module 456. The latency calculation module 456 can identify information to facilitate the latency calculation module 406 calculating expected latency for a connection with a user computing system 104. For example, the latency calculation module 456 can provide historical latency information for connections to user computing systems 104 in a geographic region 122B.

In some embodiments, some subsystems of the data center resource allocation system 330 may be combined and/or optional. For example, in some cases, the data center resource allocation system 330 may not include a latency calculation module 456. As a second example, the data center computer capacity identification module 452 and the instance utilization module 454 may be combined.

VII. Example Desktop Instance

Figure 5:
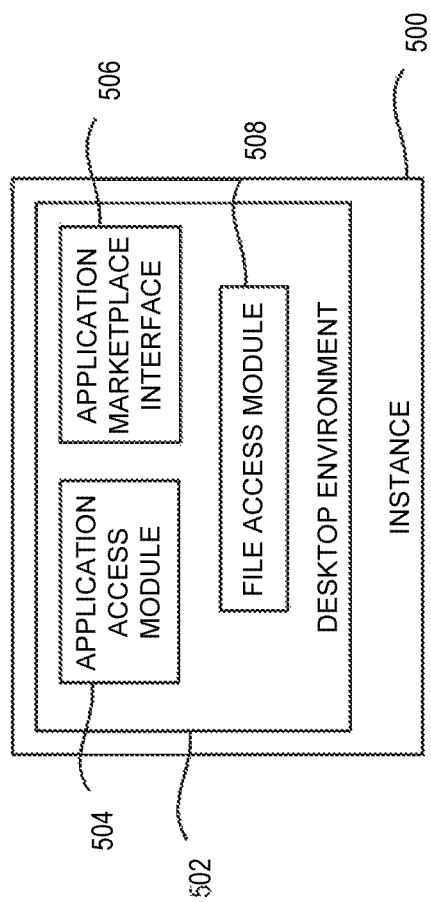
FIG. 5 illustrates an example of an instance that, in some embodiments, can be hosted by a data center computer of a data center.

FIG. 5 illustrates an example of an instance 500 that, in some embodiments, can be hosted by a data center computer 302 of a data center 102. For instance, the instance 500 may be an example of an instance 306 that can be created to provide a user with access to a virtual desktop created on a data center computer 302 by an instance manager 308 of the data center computer 302. In some cases, the instance 500 may be created or caused to be created by a deployment component 314 in response to a request by a user.

Generally, the instance 500 comprises a virtual machine that is instantiated to provide a user with access to a computing resource, or compute node, such as a virtual desktop. However, in some cases, the instance 500 may be created on the data center computer 302 without use of a virtual machine.

In the example illustrated in FIG. 5, the instance 500 includes a desktop environment 502. The desktop environment 502 can include any type of environment representing a virtual desktop. For example, the desktop environment can include an interface for interacting with files and/or applications that are stored on and/or hosted by the PES platform 120. In some cases, the desktop environment 502 may include shortcuts for accessing data and/or applications that are included or hosted by another instance 306. Further, in some cases, the desktop environment 502 can provide additional or alternative interfaces for accessing files and applications besides a desktop. For example, the desktop environment 502 can include or be a file manager. In some cases, regardless of the underlying operating system and/or hardware, the desktop environment 502 may present a particular look and feel. For example, the desktop environment 502 can be configured to emulate a Windows desktop, a Linux desktop, or an iOS desktop. In other cases, the instance 500 may be part of a virtual machine computing resource selected by a user. In such cases, the desktop environment 502 may be the desktop environment of the selected operating system for the virtual machine computing resource (e.g., Windows, Linux, etc.).

The desktop environment 502 can include an application access module 504, an application marketplace interface 506, and a file access module 508. When a user attempts to access an application via the instance 500 (e.g., from a shortcut on the desktop environment 502), the application access module 504 can provide the user with access to the application. In some cases, the application access module 504 may obtain access to another instance that includes the application desired by the user. In some embodiments, obtaining access to the application may include the application access module 504 determining whether the user is authorized to access the application and, if not, the application access module 504 can use the application marketplace interface 506 to provide the user with an opportunity to purchase or rent the application from the application marketplace 130. Further, the user can use the application marketplace interface 506 to browse applications or service images available via the application marketplace 130.

The file access module 508 can provide a user with access to files or data that are not included with the instance 500. For example, if the user attempts to access a file via the desktop environment 502, the file access module 508 can locate the file, which may be stored in another instance 306 or another data center computer 302, such as a storage server. Once the file access module 508 has located the file, it can provide the user with access to the file via the desktop environment 502. If the file is modified by the user, the file access module 508 can synchronize the file so that the modified file can be accessed by the user on the same or different computing devices. Processes for synchronizing files are described below with reference to FIGS. 12 and 13.

VIII. Example Data Center Selection Process

Figure 6:
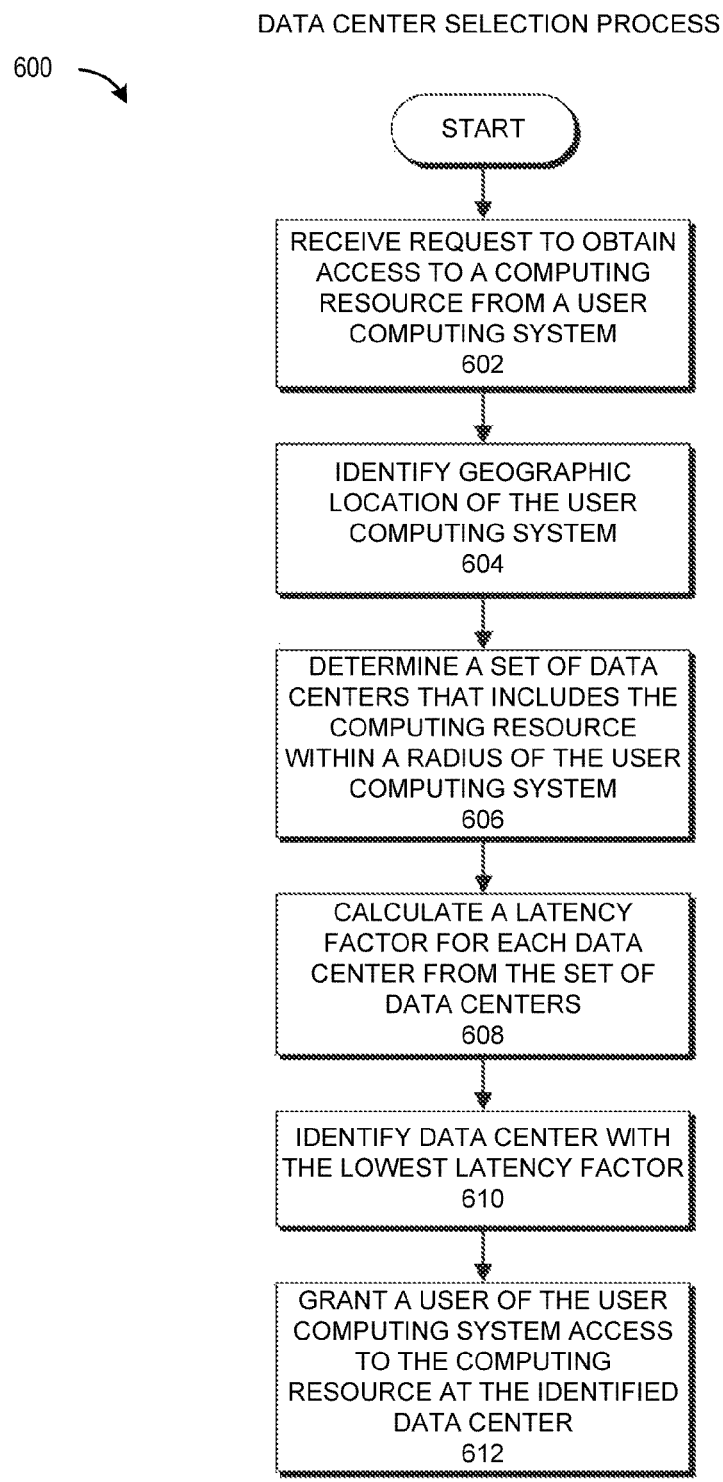
FIG. 6 illustrates an example of a data center selection process.

FIG. 6 illustrates an example of a data center selection process 600. The process 600 can be implemented, at least in part, by any system that can select a data center for use by a user (e.g., a customer or employee thereof). For example, the process 600, in whole or in part, can be implemented by the PES platform 120, the hosted computing environment resource allocation system 140, the data center computer capacity identification module 402, the instance utilization module 404, the latency calculation module 406, the application resource identification module 408, and the data center resource allocation system 330, to name a few. Although any number of systems, in whole or in part, can implement the process 600, to simplify discussion, portions of the process 600 will be described with reference to particular systems.

In certain cases, the process 600 selects an optimal data center for the user based, at least in part, on a measure of latency between a computer system of the user and the data center. Advantageously, in certain embodiments, the process 600 can be performed automatically and/or without the knowledge of the user. In other embodiments, a user may initiate the process 600.

The process 600 begins at block 602 where, for example, the PES platform 120 receives a request to obtain access to a computing resource from a user computing system 104 (e.g., the user computing system 104A). The computing request may be received in response to a user command or automatically from an application or system associated with the user computing system 104. Further, the requested computing resource can include any type of resource that may be made available by a PES platform 120. For example, the computing resource could be an application, a virtual desktop environment, computing resources for an application hosted at a data center or at the user computing system 104, file storage space, or any other resource that may be provided by the PES platform 120.

At block 604, the hosted computing environment resource allocation system 140 identifies the geographic location of the user computing system 104. Identifying the geographic location of the user computing system 104 may include identifying the user computing system's 104 location within a threshold degree of specificity. For example, block 604 may include identifying a specific address, zip code, a town, a country, a country, or any other geographic region where the user computing system 104 is located.

Further, the hosted computing environment resource allocation system 140 can use one or more mechanisms to identify or confirm the geographic location of the user computing system 104. For example, the resource allocation system 140 may use an Internet Protocol (IP) address of the user computing system 104 to identify its location. As another example, the hosted computing environment resource allocation system 140 may use Global Positioning System (GPS) data to identify the user computing system's 104 location. In yet another example, the hosted computing environment resource allocation system 140 may query a user of the user computing system 104 to establish its location.

At block 606, the hosted computing environment resource allocation system 140 determines a set of data centers 102 that includes the computing resource requested at the block 602 within a radius of the user computing device 104. The hosted computing environment resource allocation system 140 may use one or more of the data center computer capacity identification module 402, the instance utilization module 404, and the application resource identification module 408 to facilitate identifying the set of data centers 102 that include the requested computing resource. Further, in some cases, the hosted computing environment resource allocation system 140 may access the data center resource allocation system 330 of each data center 102 to facilitate determining the set of data centers 102 that include the requested computing resource. Moreover, in some cases, the hosted computing environment resource allocation system 140 determines the set of data centers 102 from data centers that the user is authorized to access. Determining whether the data center 102 includes the requested resource may also include determining whether the data center 102 includes additional resources based, for example, on a user profile or a set of desktop placement rules, which are described in more detail below, associated with the user or an entity that employs the user. For example, the hosted computing environments resource allocation system 140 may determine whether each data center 102 includes at least an availability threshold amount of data storage availability if a usage profile associated with the user indicates that the user utilizes more than a usage threshold amount of storage resources.

In some cases, the radius may be predefined or may be set by a user. In other cases, all data centers may be identified that include the computing resource regardless of their location with respect to the user computing system 104. In some embodiments, the request received at the block 602 may identify multiple computing resources. In such cases, the hosted computing environment resource allocation system 140 identifies the set of data centers 102 that include all of the desired computing resources.

However, in cases where none of the data centers 102 include all of the desired computing resources, the hosted computing environment resource allocation system 140 may identify the set of data centers 102 that include the greatest number of requested computing resources. In some cases, a user may identify certain requested computing resources as more important that others. In such cases, the hosted computing environment resource allocation system 140 may weight the more important computing resources higher when identifying data centers 102 that include some but not all of the requested computing resources.

Although the term radius is used, the geographic region examined by the resource allocation system 140 is not necessarily circular or centered around the user computing device 104. Instead, in some cases, the geographic region searched may be of any other geometric shape or may be based on geo-political breakdowns of a geographic area, such as a state or a country.

In some embodiments, the set of data centers 102 identified at the block 606 may be filtered based on any attribute of the user or metadata associated with the user. For instance, the selection of data centers may be filtered based on an affiliation of the user requesting access to the resource. For example, assuming the user is an employee of an entity, if the entity has purchased access to three data centers, the set of data centers 102 identified at the block 606 will restricted to the three data centers, even if additional data centers exist within the radius that include the computing resource desired by the user. As another example, the set of data centers 102 identified may be filtered based on a quality of service purchased by the user. Thus, a user requires constant access to computing resources of a data center 102 without downtime may purchase platinum level access. In such cases, the data centers 102 identified at the block 606 may be filtered to identify data centers 102 that have a higher rate of reliability and a lower rate of subscription compared to a data center 102 used for users who are satisfied with bronze level access.

In some embodiments, if no data centers 102 are identified at the block 606, the hosted computing environment resource allocation system 140 may expand the radius to search. Alternatively, or in addition, the hosted computing environment resource allocation system 140 may cause the computing resource to be copied from a data center that includes the resource to a data center within the radius searched at the block 606. In other cases, the user may be denied access to the computing resource if no data centers 102 within the searched radius include the desired computing resource.

In some embodiments, the block 606 may be optional. For example, in some cases, each data center 102 may include the same resources and/or may be located within a specified radius. As a second example, the process 600 may be performed for all data centers 102.

At block 608, the latency calculation module 406 calculates a latency factor for each data center 102 from the set of data centers identified at the block 606. The latency factor represents an expected latency in communication between a data center 102 and a user computing system 104. Further, the latency factor can be based on a variety of factors including the distance between the data center 102 and the user computing system 104, outcomes of one or more latency tests, and historical latency information, to name a few. In some embodiments, the latency factor is calculated based on a particular system associated with the user computer system 104 and/or the data center 102. For example, the latency factor may be based on communication between an egress computing system at the data center 102 (e.g., a router or gateway at the network 306 connecting the data center to the network 106) and the user computing system 104. As a second example, the latency factor may be based on communication between a router located in a geographic region 122 in communication with the user computing system 104 and a system at the data center 102. In some cases, the latency factor for at least some of the data centers 102 may be calculated in parallel thereby speeding up performance of the process 600 compared to cases where the latency factor for each data center 102 is calculated sequentially. Calculating the latency factor is discussed in more detail below with respect to FIG. 7.

The hosted computing environment resource allocation system 140 identifies the data center 102 with the lowest latency factor at the block 610. If more than one data center 102 shares the lowest latency factor, the hosted computing environment resource allocation system 140 can use a tie breaking factor to select a data center 102. The tie breaking factor can include any characteristic that can be used to select one data center over another. For example, the tie breaking factor can be based on one or more of the utilization rate of each data center 102, unallocated resources at each data center 102, distance of each data center 102 to the user computing system 104, additional users that have access to each data center 102, etc. Alternatively, the hosted computing environment resource allocation system 140 may select at random the data center 102 from the set of data centers 102 that share the lowest latency rate. As another alternative, the hosted computing environment resource allocation system 140 may use a round robin process that selects a different data center 102 in a particular order for each request processed.

In some embodiments, the data center 102 selected at the block 610 may not be the data center with the lowest latency factor, but may be the data center 102 with the lowest latency factor that meets one or more additional requirements. For instance, suppose, for example, that for redundancy purposes each data center 102 is configured to allocate a maximum of 90% of available processor resources. If the data center 102a has already allocated 90% of available processor resources, the data center 102a may not be eligible for selection even if it is associated with the lowest latency factor for a particular requesting user computing system 104.

At block 612, the hosted computing environment 114 grants a user of the user computing system 104 access to the computing resource at the identified data center 102. In some embodiments, granting the user access to the data center 102 can include associating one or more accounts of the user with the data center 102. Alternatively, or in addition, granting the user access to the data center 102 can include associating the user computing system 104 with the data center 102. Further, in some cases, each user computing system 104 of the user may be associated with the data center 102 to, for example, maintain consistency in available data and resources for the user. Moreover, in some cases, granting access to the data center 102 may include automatically connecting to the data center 102 each time the user or associated user computing system 104 attempts to access data or a computing resource from the PES platform 120.

In some embodiments, the hosted computing environment resource allocation system 140 may use the location of the user computing system 104 to determine an order for performing one or more operations associated with the process 600. For example, the order in which the latency calculations are performed at the block 608 may be based on the location of the user computing system 104.

IX. Example Latency Factor Calculation Process

Figure 7:
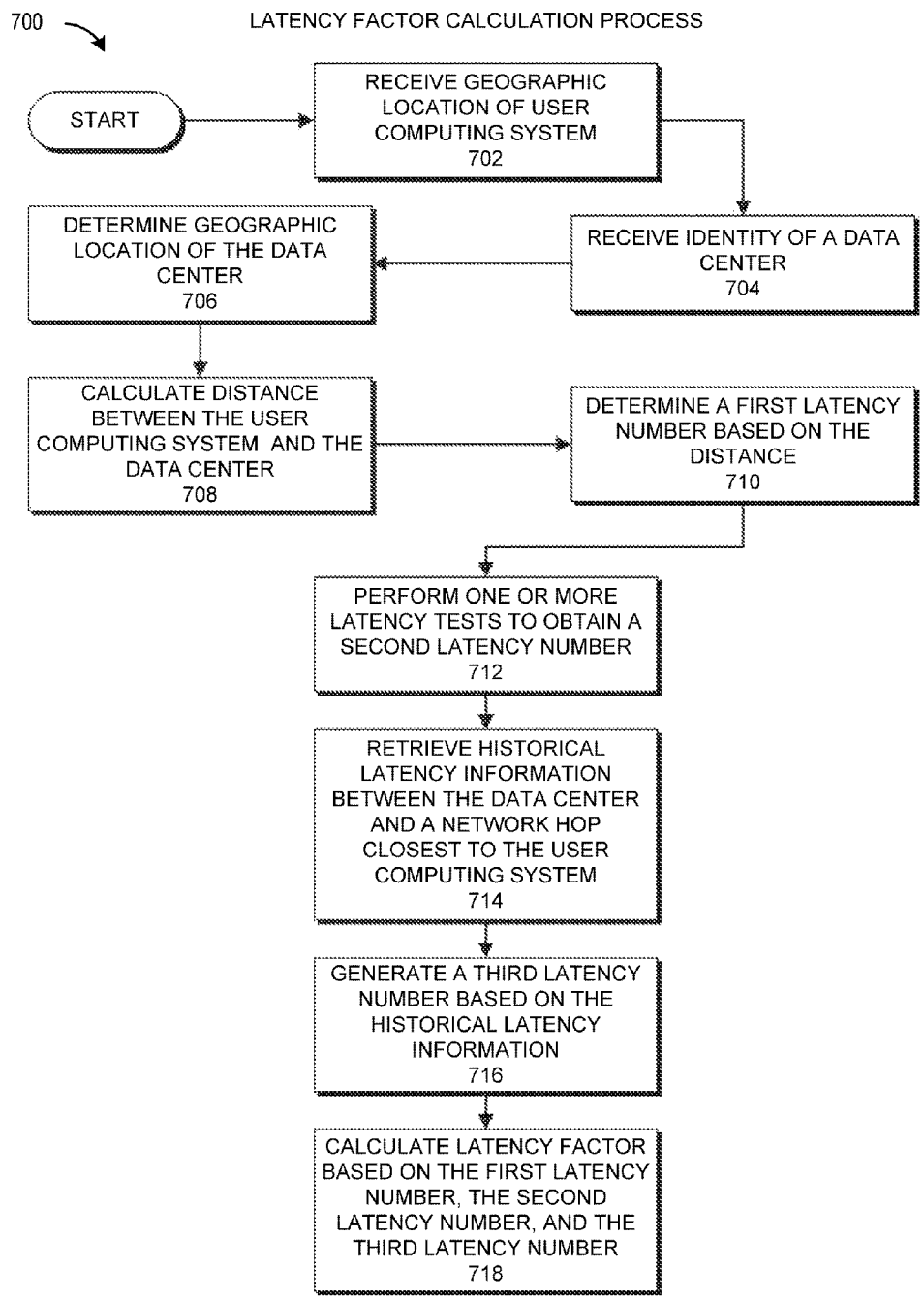
FIG. 7 illustrates an example of a latency factor calculation process.

FIG. 7 illustrates an example of a latency factor calculation process 700. The process 700 can be implemented, at least in part, by any system that can calculate a latency factor for a data center 102. The latency factor can include a measure of an expected level of latency for communicating between a user computing system 104 and a data center 102. Further, the process 700 may be performed as part of the process 600, e.g., as part of the block 608. The process 700, in whole or in part, can be implemented, for example, by the PES platform 120, the hosted computing environment resource allocation system 140, the latency calculation module 406, the data center resource allocation system 330, and the latency calculation module 456, to name a few. Although any number of systems, in whole or in part, can implement the process 700, to simplify discussion, portions of the process 700 will be described with reference to particular systems.

The process 700 begins at block 702 where, for example, the latency calculation module 406 receives a geographic location of a user computing system 104. The geographic location may be received from the hosted computing environment resource allocation system 140 or any other system that can determine the geographic location of the user computing system 104. Alternatively, the latency calculation module 406 may determine the geographic location itself based on, for example, the IP address of the user computing system 104. In some embodiments, the block 702 can include some or all of the embodiments described above with respect to block 604.

At block 704, the latency calculation module 406 receives the identification of a data center 102. The latency calculation module 406 determines the geographic location of the data center 102 at block 706. The geographic location of the data center 102 may be determined by accessing the common repository 112. Alternatively, the geographic location of each data center 102 may be stored at the latency calculation module 406. As another alternative, the latency calculation module 406 may query the data center 102 to determine its geographic location.

Based on the geographic location of the user computing system 102 and the data center 102, the latency calculation module 406 can calculate the distance between the user computing system 104 and the data center 102 at block 708. In some cases, the distance may be based, at least in part, on a physical distance between the user computing system 104 and the data center 102. Alternatively, or in addition, the distance may be based, at least in part, on the length of one or more network communication paths between the data center 102 and the user computing system 104.

At block 710, the latency calculation module 406 may determine a first latency number, L1, based on the distance calculated at the block 708. In some embodiments, the first latency number may further be based, at least in part, on the types of connections and/or the network hardware utilized between the user computing system 104 and the data center 102. For example, if half the route between the data center 102 and the user computing system 104 comprises optic fiber a different first latency number may be determined than if copper wires serviced that portion of the route.

The latency calculation module 406 performs one or more latency tests to obtain a second latency number, L2, at the block 712. The latency tests can include any type of network or connection test that can be used to obtain an estimate of latency between two computing systems. For example, the latency tests can include a ping operation, a traceroute operation, a traceroute6 operation, a tracert operation, a tracepath operation, and the like. In embodiments where multiple latency tests are performed, the block 712 can include aggregating (e.g., averaging, summing, etc.) the results of the latency tests.

At block 714, the latency calculation module 406 retrieves historical latency information between the data center 102 and a network hop closest to the user computing system 104. The network hop can include any network or communication hardware (e.g., a router or a gateway) that sends and/or forwards communication packets between the data center 102 and the user computing system 104. The network hop closest to the user computing system 104 may refer to the network hop that is physically closest to the user computing system 104 and/or the first network hop to receive a packet when it is sent by the user computing system 104 to the PES platform 120. In some embodiments, identifying the network hop can include accessing a lookup table and/or accessing a network topology map to determine the network hop closest to the user computing system 104. The lookup table and/or network map may be stored at the common repository 112 or publicly accessible repository included in the network 106.

Using the historical latency information, the latency calculation module 406 generates a third latency number, L3, at the block 716. The third latency number may be derived from the historical latency information (e.g., an average or time weighted average of the historical latency information, etc.). At block 718, the latency calculation module 406 calculates a latency factor, D, for the data center 102 based on the first latency number, the second latency number, and the third latency number. Further, in some cases, each latency number may be weighted using, for example, empirically determined weighting factors (e.g., A1, A2, and A3). Thus, for example, the latency factor may be calculated using formula 1 below.

$$D = A1*L1 + A2*L2 + A3*L3 \quad (1)$$

Although the latency factor calculated using formula 1 is a weighted summation of the first, second, and third latency numbers, it is possible to base the latency factor on other mathematical combinations of the latency numbers. Further, in some cases, the latency factor may be determined by accessing a table of latency factors indexed by one or more of the latency numbers or a combination thereof.

In some embodiments, one or more of the latency numbers may be excluded from calculating the latency factor. In such instances, the associated blocks from FIG. 7 may be optional. For instance, the latency factor may be calculated without the third latency number related to the historical latency information. In such cases, the blocks 714 and 716 may be optional.

In some cases, one or more of the latency numbers, or factors, correlate, at least in part, to the latency of a communication channel between the data center 102 and the user computing system 104. Thus, in some embodiments, the process 7 and the process 6 can be used to select a data center 102 that is expected to have a minimum latency compared to communication channels between the user computing system 104 and other data centers 102. Alternatively, or in addition, the process 7 and the process 6 can be used to select a data center 102 that is expected to have a latency below a threshold level when in communication with the user computing device 104.

X. Example Desktop Placement Configuration Process

Figure 8:
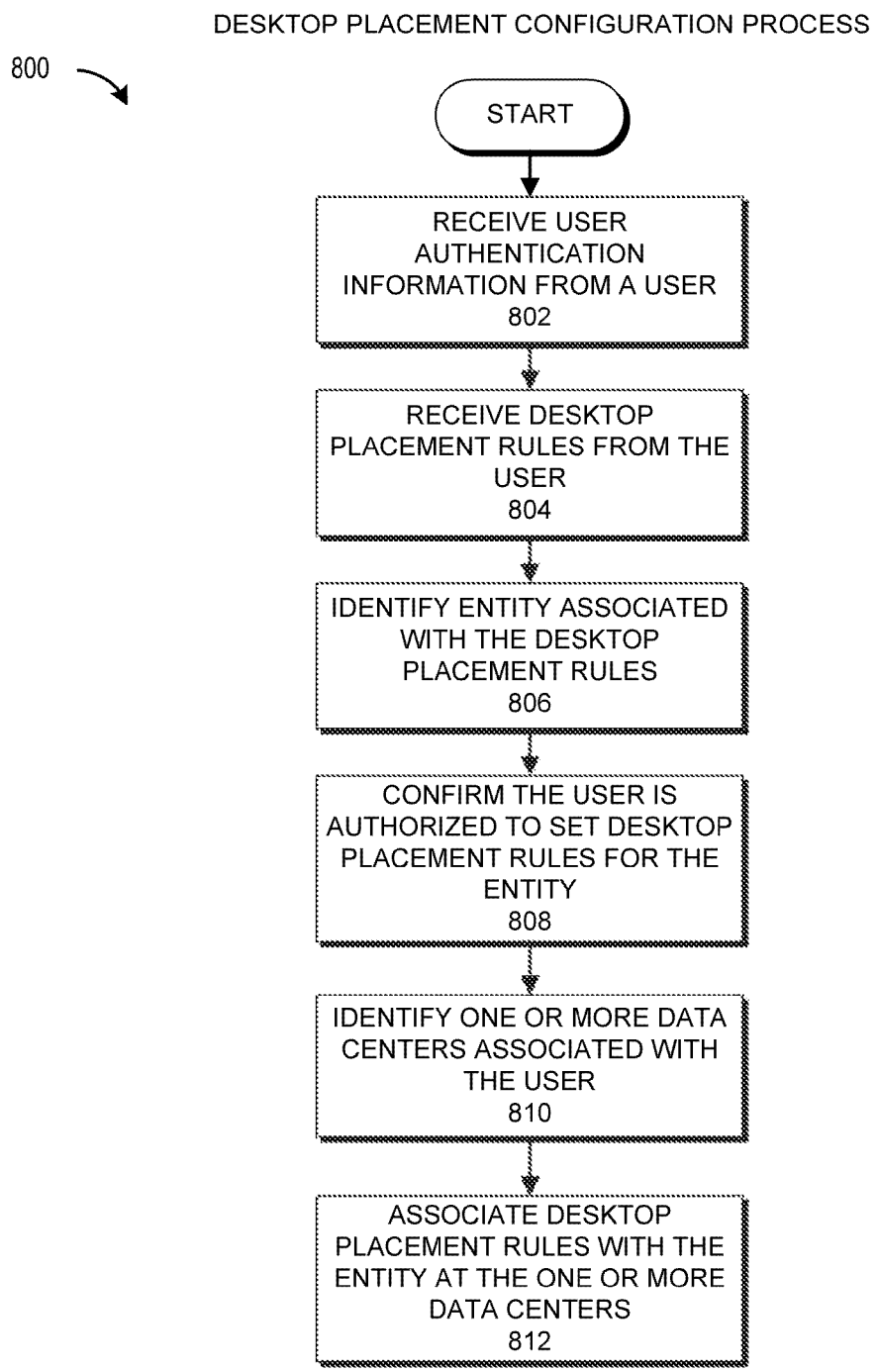
FIG. 8 illustrates an example of a desktop placement configuration process.

FIG. 8 illustrates an example of a desktop placement configuration process 800. The process 800 can be implemented, at least in part, by any system that can configure a PES platform 120 and/or one or more data centers 102 thereof based on a set of rules (e.g., desktop placement rules) for the allocation of instances (e.g., virtual desktops, applications, etc.). For example, the process 800, in whole or in part, can be implemented by the PES platform 120, the hosted computing environment 114, the hosted computing environment resource allocation system 140, the data center resource allocation system 330, the management computer 304, the management component 310, and the deployment component 314, to name a few. Although any number of systems, in whole or in part, can implement the process 800, to simplify discussion, portions of the process 800 will be described with reference to particular systems.

Although the FIG. 8 is described with reference to virtual desktops and desktop placement rules, the process 800 is not limited as such. The process 800 can be used to configure data centers 102 based on any type of computing resource placement rules for determining how to allocate any type of computing resource including virtual desktops, applications, processor utilization, data storage, etc.

The process 800 begins at block 802 where, for example, the hosted computing environment 114 receives user authentication information from a user via, for example, a user computing system 104. In some cases, a particular data center 102 of the hosted computing environment 114 receives the authentication information. Although not required in all cases, typically the user is associated with elevated permissions (e.g., an administrator or other super user) compared to at least some other users.

At block 804, the hosted computer environment 114 receives desktop placement rules from the user. The desktop placement rules can be associated with a particular data center 102 or with multiple data centers. For example, the desktop placement rules may be associated with all data centers 102 that the user is authorized to access. As a second example, the desktop placement rules may be associated with all data centers that users of a particular group (e.g., a developer team or a marketing team of an entity) are authorized to access.

Further, the desktop placement rules can include any type of rules for placing a virtual desktop at a data center 102. For example, the desktop placement rules may specify that any particular computing system at a data center 102 service no more than a threshold percentage of users of an entity, or users of a subgroup or department (e.g., accounting, research and development, etc.) of an entity. In some cases, the desktop placement rules may specify that no two members of a particular group be serviced by the same computer system at the data center 102. Further, in some cases, the desktop placement rules may specify that a subset of users be allocated to computer systems that do not share a rack, a backup battery, a power bus, a rack switch, a power source, a router, data storage, a data storage system, etc. Advantageously, in certain embodiments, by limiting the percentage of users that are allocated computing resources from a particular computing system or from a set of computing systems that share some type of resource (e.g., a backup battery), the number of users who lose access or need to be transferred to another computing system are limited in the event that the computing system becomes inaccessible or a resource becomes inaccessible (e.g., a router at the data center 102) thereby reducing the negative consequences that can occur when computing resources are lost.

In some cases, the desktop placement rules may be based on user profiles associated with the users governed by the desktop placement rules. For example, the desktop placement rules may specify that a user whose user profile indicates that the user utilizes a number of graphics intensive applications be allocated a computing system at the data center 102 that includes a more powerful graphics card than some other computing systems at the data center 102. As a second example, a user whose user profile indicates that the user requires a lot of storage space may be allocated access to a computing system at the data center 102 that is associated with a data storage with storage space availability that exceeds a threshold or that is greater than the storage space availability of other data storages.

In addition, in some cases, the desktop placement rules can include rules specifying the applications that a set of users are authorized to access, either directly or via a virtual desktop. Further, the desktop placement rules may specify a default configuration for a virtual desktop requisitioned by a user.

Moreover, as stated above, in some embodiments, the desktop placement rules can be associated with any type of computing resource and not just desktops, or virtual desktops.

At block 806, the hosted computing environment 114 identifies an entity (e.g., a company that employs the user) associated with the desktop placement rules. In some embodiments, the hosted computing environment 114 identifies a subgroup of users associated with the entity at the block 806. The subgroup of users may be, for example, a department within the organizational structure of the entity or a group of users located at a particular location (e.g., the U.K. office of the entity). In some embodiments, the block 806 is optional. For example, the user may set the desktop placement rules for the user's personal use.

The hosted computing environment 114 confirms at block 808 that the user is authorized to set the desktop placement rules for the entity identified at the block 806. This determination of authorization may be made based, at least in part, on the user authentication information received at the block 802. Further, in some cases, the determination of authorization may be made based on metadata associated with the user, such as the user's department, role, or job title at the entity.

At block 810, the hosted computing environment 114 identifies one or more data centers 102 associated with the user. Alternatively, or in addition, the hosted computing environment 114 may identify the one or more data centers 102 based on the desktop placement rules. In some embodiments, the block 810 is optional. For example, the desktop placement rules may specify desktop placement rules for all data centers 102 of the hosted computing environment 114.

At block 812, the hosted computing environment 114 associates the desktop placement rules with the entity at the one or more data centers 102 identified at the block 810. Associating the desktop placement rules with the entity at the one or more data centers 102 can include storing the desktop placement rules at the data center repository 332 of each data center 102 identified at the block 810. Further, in some cases, the block 812 can include providing the desktop placement rules to the management computer 304.

XI. Example Desktop Provisioning Process

Figure 9:
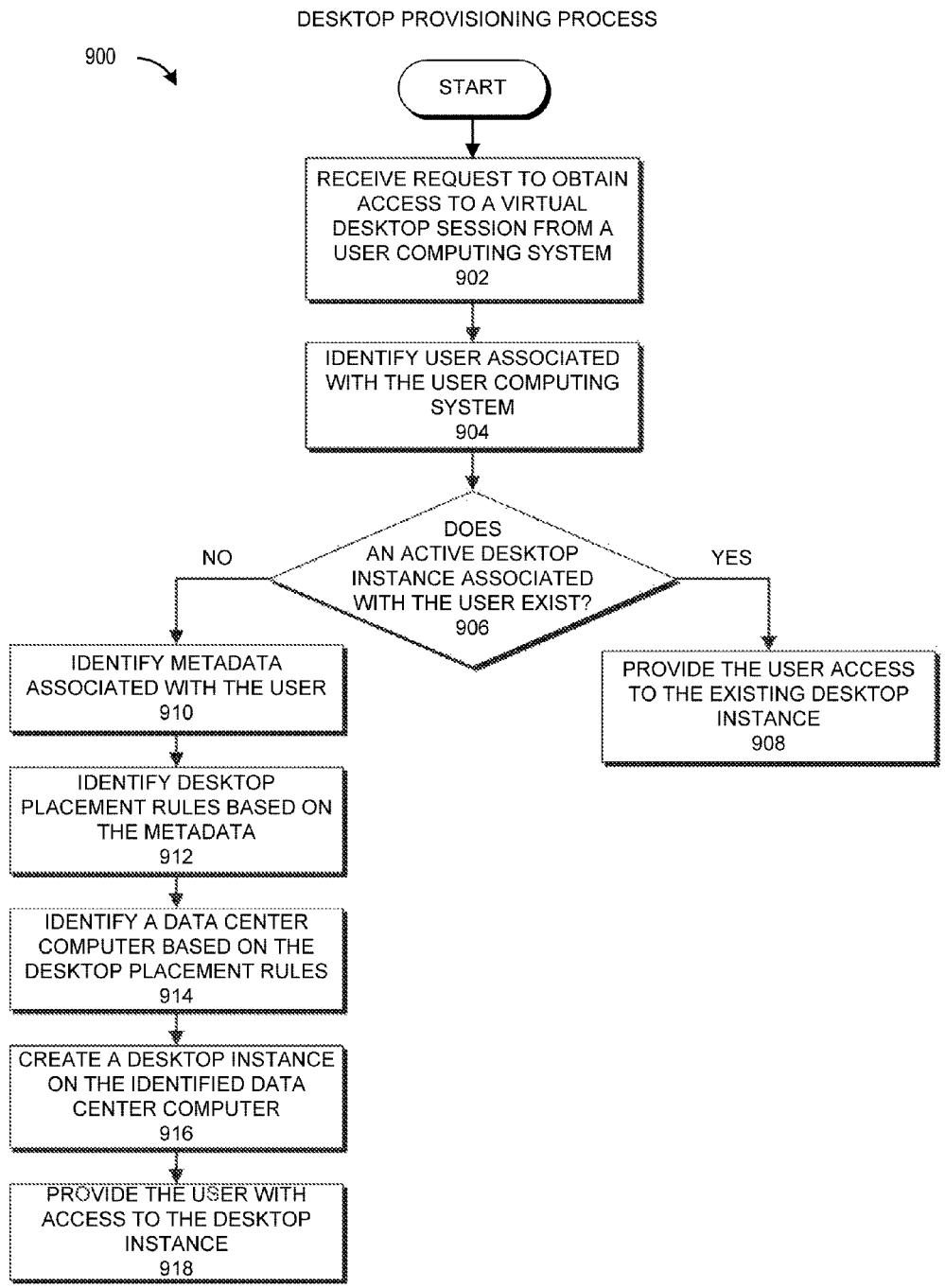
FIG. 9 illustrates an example of a desktop provisioning process.

FIG. 9 illustrates an example of a desktop provisioning process 900. The process 900 can be implemented, at least in part, by any system that can deploy an instance on a computing system (e.g., a data center computer 302) at a data center 102. For example, the process 900, in whole or in part, can be implemented by the PES platform 120, the hosted computing environment 114, a data center 102, a management computer 304, a management component 310, and a deployment component 314, to name a few. Although any number of systems, in whole or in part, can implement the process 900, to simplify discussion, portions of the process 900 will be described with reference to particular systems.

Although the FIG. 9 is described with reference to virtual desktops and desktop instances, the process 900 is not limited as such. The process 900 can be used to deploy any type of instance that can be instantiated at a computing system of a data center 102 including, for example, an application, a storage folder, etc.

The process 900 begins at block 902 where, for example, the management computer 304 receives a request to obtain access to a virtual desktop session from a user computing system 104. The request may be received from a user or an application. As previously stated, the request is not limited to virtual desktops. For example, the request may be for access to an instance of an application.

At block 904, the management component 310 identifies a user associated with the user computing system 104. The management component 310 may identify the user based on authentication information received with the request at the block 902. Alternatively, or in addition, the management component 310 may identify the user based on metadata associated with the user computing system 104, such as an IP address or name associated with the user computing system 104. In some cases, instead of or in addition to identifying the user, the management component 310 may identify an entity, department, or other group associated with the user. In some embodiments, the block 904 is optional. For example, the provisioning of desktop instances may be based on a measure of utilization of each data center computer 302 at the data center 102 or any other factor that does not require identification of the requesting user or associated entity, etc.

At decision block 906, the deployment component 314 determines whether an active desktop instance 306 associated with the user exists. An active instance 306 may include an instance that is running or currently being executed on a data center computer 302. Further, in some cases, an active instance 306 may include an instance that has been cached at a data center computer 302. If the deployment component 314 determines that an active desktop associated with the user exists, the deployment component 314 at block 908 may provide the user with access to the existing desktop instance 306 at the data center computer 302 hosting the existing desktop instance 306.

In some embodiments, one or more of the decision block 906 and the block 908 may be optional. For example, if the requesting user is a new user or the request received at the block 902 explicitly requests a new desktop instance, the decision block 906 may be optional. As another example, if the load on or utilization of the data center computer 302 that is hosting the existing desktop instance 306 exceeds a threshold (e.g., due to additional users accessing the data center computer 302) then the user may not be granted access to the existing desktop instance and the block 908 may be optional. Alternatively, the existing desktop instance may be transferred to another data center computer 302 as part of the block 908 thereby enabling the user to obtain access to the existing desktop instance despite the data center computer 302 that originally hosted the existing desktop instance satisfying its threshold load or utilization.

If the deployment component 314 determines that an active desktop associated with the user does not exist, the management component 310 identifies metadata associated with the user at block 910. Alternatively, or in addition, the management component identifies metadata associated with the user computing system 104. In some embodiments, the management component 310 identifies the metadata by accessing a directory to obtain information associated with the user, such as the user's role at an entity, job title, department, etc. This directory may be implemented and/or accessed using Lightweight Directory Access Protocol (LDAP) or any other known application protocol for accessing and maintaining a distributed directory. In some cases, the directory may be stored at the data center repository 332. In some embodiments, the metadata may include user profile information associated with the user's usage of computing resources. For example, the user profile may indicate whether the user utilizes a number of applications that are graphics intensive (e.g., animation programs, modeling programs, etc.). As a second example, the user profile may indicate that the user generates a lot of data compared to other users affiliated with the entity that employs the user or other users of the data center 102 and therefore may require more storage space than the other users.

At block 912, the management component 310 identifies desktop placement rules based on the metadata obtained at the block 910. These desktop placement rules may be accessed from the data center repository 332. For example, if the user is identified as belong to a trading desk department at a brokerage entity, the management component 310 may retrieve desktop placement rules associated with the trading desk department of the brokerage entity.

The deployment component 314 identifies a data center computer 302 based on the desktop placement rules at block 914. As described above with respect to FIG. 8, the desktop placement rules can include any rules for selecting a data center computer 302 at the data center 102 to host an instance (e.g., a virtual desktop instance) and/or to provide computing resources to a user. For example, the desktop placement rules may specify that no data center computer host more than two employees from a department of an entity. As a second example, the desktop placement rules may specify that a particular department or a particular entity does not share access to the same data center computer 302. In some embodiments, the deployments component 314 may use the user's usage profile to facilitate identifying a data center computer 302.

In some embodiments, the deployment component 314 may use the data center resource allocation system 330 to facilitate identifying a data center computer 302. For example, the deployment component 314 may use the data center computer capacity identification module 452 to identify the available capacity of a data center computer 302. As a second example, the deployment component 314 may use the instance utilization module 454 to determine the availability of additional instances at a data center computer 302. Further, the deployment component 314 may use the application resource identification module 458 to determine whether the data center computer 302 has access to an application resource requested by the user or specified as part of the desktop placement rules for configuration of the virtual desktop instance.

Once a data center computer 302 has been selected, the deployment component 314 creates a desktop instance on the identified data center computer 302 at block 916. In some cases, creating the desktop instance may be based on the desktop placement rules. For example, the desktop placement rules may specify a configuration for the desktop instance (e.g., the amount of memory allocated for the desktop instance, or applications that are pre-configured for access via the desktop instance).

At block 918, the management component 310 provides the user with access to the desktop instance. In some embodiments, the block 918 may further including logging the creation of and/or access to the desktop instance. Further, in some cases, another user (e.g., an administrator) may be informed of the creation of and/or access to the desktop instance.

XII. Example Application Access Process

Figure 10:
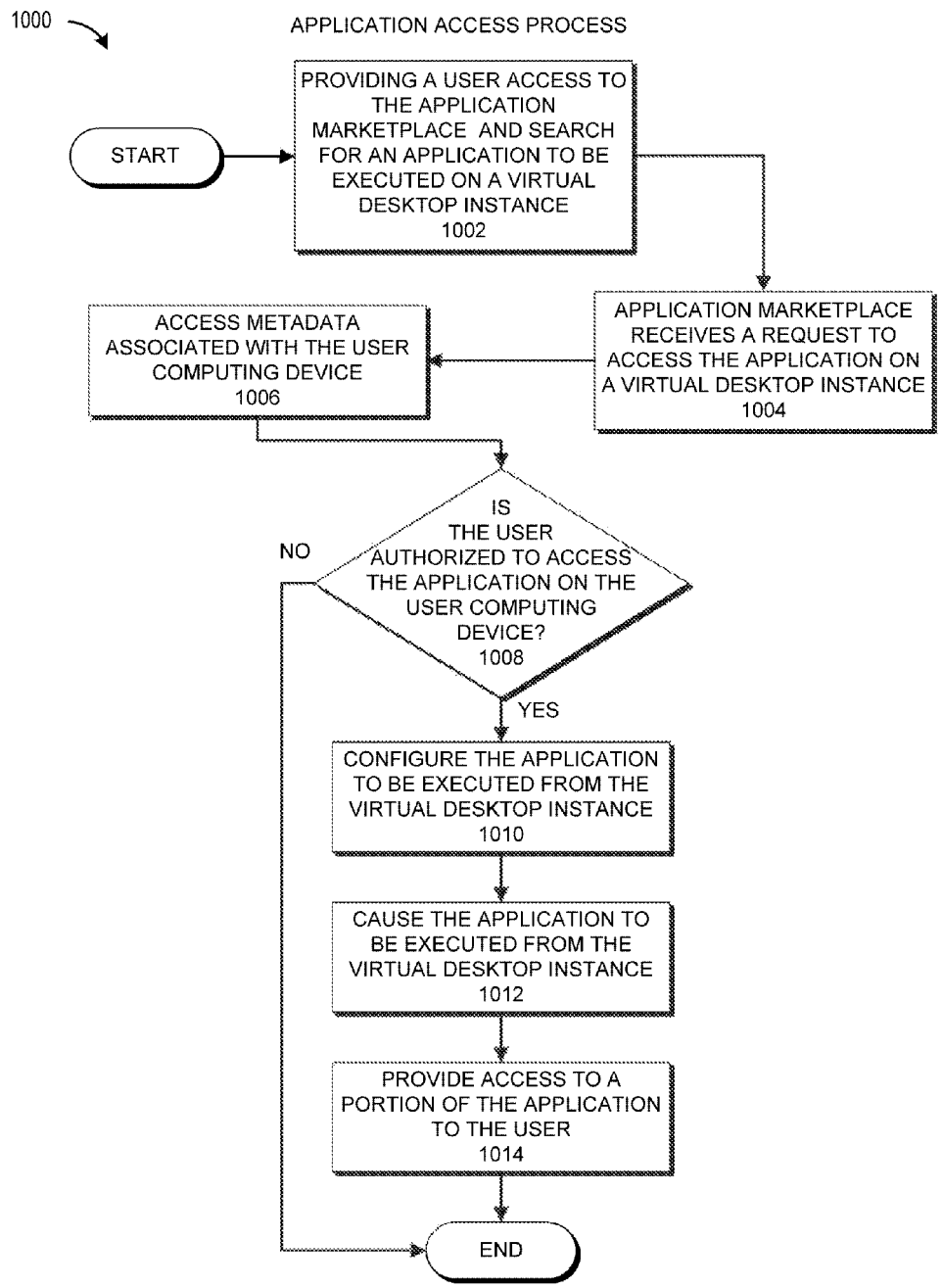
FIG. 10 illustrates an example of a process of accessing an application through the Application Marketplace.

FIG. 10 illustrates an embodiment of a process of accessing an application available from a data center of a PES platform 120. As previously described in FIG. 1B each data center includes one or more physical computing systems configurable to execute a number of virtual desktop instances. Each virtual desktop instance may include an operating system, such as a Microsoft Windows® operating system, a MAC OS® operating system, a Linux operating system, an Oracle® Solaris operating system, etc. The operating system included in each virtual desktop instance may be configured to execute one or more applications in the application marketplace 130. The virtual desktop instances may be accessed by a user of the PES via a network. Moreover, the user of the PES may search for applications or virtual desktop instances in the application marketplace 130 via the marketplace interface 212.

In the illustrated embodiment, the process 1000 begins at block 1002, where access to the application marketplace 130 is provided to a user computing device associated with a user of the PES. The user computing device accessing the application marketplace may search for an application to be executed by the virtual desktop instance via the marketplace interface 212. For example, the user may search for the Linux version of the Matlab® software in the application marketplace 130 via the marketplace interface 212.

The process 1000 continues to block 1004 and receives a request from the user to access the application on a virtual desktop instance from the user computing device. The request may be made by the user through the application marketplace 130. In the example referenced above, the user may request access to the Linux version of the Matlab® software. The user's virtual desktop instance may include at least the Linux operating system and the Matlab® software.

The process 1000 continues to block 1006 and accesses metadata associated with the user computing device. The metadata may be indicative of whether the user is authorized to access the application from the PES on the user computing device. For example, the metadata associated with the user computing device may indicate that the user is currently using a desktop PC located in her office, and according to security settings associated with the user's PES account and application marketplace preferences, the user is authorized to access the Matlab® software from the desktop PC in her office. In another example, the metadata associated with another user computing device may indicate that the user is accessing the virtual desktop instance from her smartphone, and according to security settings associated with user's PES account and application marketplace preferences, the user is not authorized to access the Matlab® software from her smartphone. In some embodiments, the metadata may include information such as, e.g., the application marketplace account of the user, account type, access levels, the type of the device the user is using (tablet, desktop computer, etc.), the name of the device, media access control (MAC) address, location of the user, the user's domain, whether the user is accessing the application marketplace 130 through residential internet or connection provided by the user's employer, and/or whether the user is using a proxy to access the application marketplace 130, etc.

The process 1000 continues to decision block 1008 to determine, based at least in part on the metadata, whether the user is authorized to access the application on the user computing device. In some embodiments, determining whether the user is authorized to access the application may include determining whether the application is available for access at a data center 102 associated with the user or that the user's virtual desktop instance is located. In some cases, if a copy of the application is not available at the data center 102 that the user's virtual desktop instance is located, the management computer 304 of the data center 102 may request a copy of the application from the PES platform 120. Alternatively, the user may be denied access to the application. If the user is not authorized to access the application, the process 1000 ends.

However, if the user is authorized to access the application, the process continues to block 1010, and configures the application to be executed on the virtual desktop instance. The application may be configured to be suitable for the operating system or other settings by the user and the application marketplace 130. In some embodiments, the application may reside on a physical computing system in a data center 102 in the PES platform 120, and the physical computing system may be different from the physical computing system that the user is connected to. In some cases, the application may be in the application repository 220. In some cases, a copy of some or all of the application may be downloaded to the physical computing system that the user is connected to.

The process continues to block 1012 and causes the application to be executed from the virtual desktop instance. The process then continues to block 1014 and provides access to at least a portion of the application from the virtual desktop instance to the user computing device.

In some embodiments, only the user interface of the application is provided to the user's computing device, and the user interface accepts input from the user computing device and provides the user input to the application. In some other embodiments, the portion of the application provided to the user's computing device may be the entire copy of the application. For example, in the use case above, the entire Matlab® software may be provided to the user's computing device. In some other instances, providing access to at least a portion of the application may include delivering (e.g., streaming) a portion of the application to the user computing device. For instance, in the use case above, only the libraries currently used by the user in the Matlab® software and the interface of the Matlab® software are provided to the user computing device.

In another example, providing access to at least a portion of the application may include streaming a local virtual desktop instance to the computing instance. The local virtual desktop instance can be configured to execute the application on the user computing device. For example, the user computing device may receive the virtual desktop instance, which includes the Linux operating system, and the application (the Matlab® software) running on the Linux operating system. In other embodiments, a virtual machine or container may be streamed to the user computing system 104. This virtual machine or container may be configured to run application as it is streamed to the user computing system 104 and/or after streaming of the application is complete. In certain embodiments, the virtual machine, container, and/or any portion of the application streamed to the user computing system 104 is removed from the user computing system 104 after the user has completed a current session of using the application. Advantageously, in certain embodiments, by streaming an application, or a portion thereof, to a user computing system 104 and then removing the application, or the portion thereof, upon completion of a usage session, a user can purchase a temporary license to use an application. Further, a user can use applications on user computing systems 104 that may normally be incapable of running the applications due, for example, to storage space constraints, memory constraints, graphics constraints, or other hardware and/or software constraints of the user computing system 104. The usage session can include a single time period of use of the application, or a rental or licensing time period for the application. In other cases, the usage session may include a period of time beginning when the application is streamed to the user computing system 104 and ending when the user computing system 104 disconnects from the data center 102 and/or an instance hosted at the data center 102.

The application marketplace 130 according to this disclosure may provide a variety of options for users to pay for the applications to be executed on their virtual desktop instances. For example, a user may choose to purchase, rent, or license the application she is interested in. In some cases, group of users may choose to pay for a group license. Accordingly, in some situations, the metadata used to determine whether the user is configured to access the application on the user computing device may include whether the user has purchased, rented, or licensed the application from the application marketplace 130. The billing system 218 of the application marketplace 130 can be configured to manage the purchasing, rental, or licensing of the applications, operating systems, virtual desktops, and so forth that are available from the application marketplace.

If a user chooses to rent or license an application instead of purchasing it, the application marketplace 130 may notify the user before the end of the rental or license period. The notification may include options for the user to renew the rental or license agreement for some period of time and options for purchasing the software. In some embodiments, at the expiration of the rental period, the data center computer 302 hosting the application for the user may automatically block continued access to the application if, for example, the user has declined to pay for additional rental time. In some such cases, the data center computer 302 may automatically save user data to a storage device and/or to a folder (e.g., a cloud folder) associated with the user that may be accessible from a virtual desktop instance associated with the user. Further, in some cases, the data may automatically be synchronized to one or more user computing systems 104.

XIII. Example File Synchronization System

Figure 11:
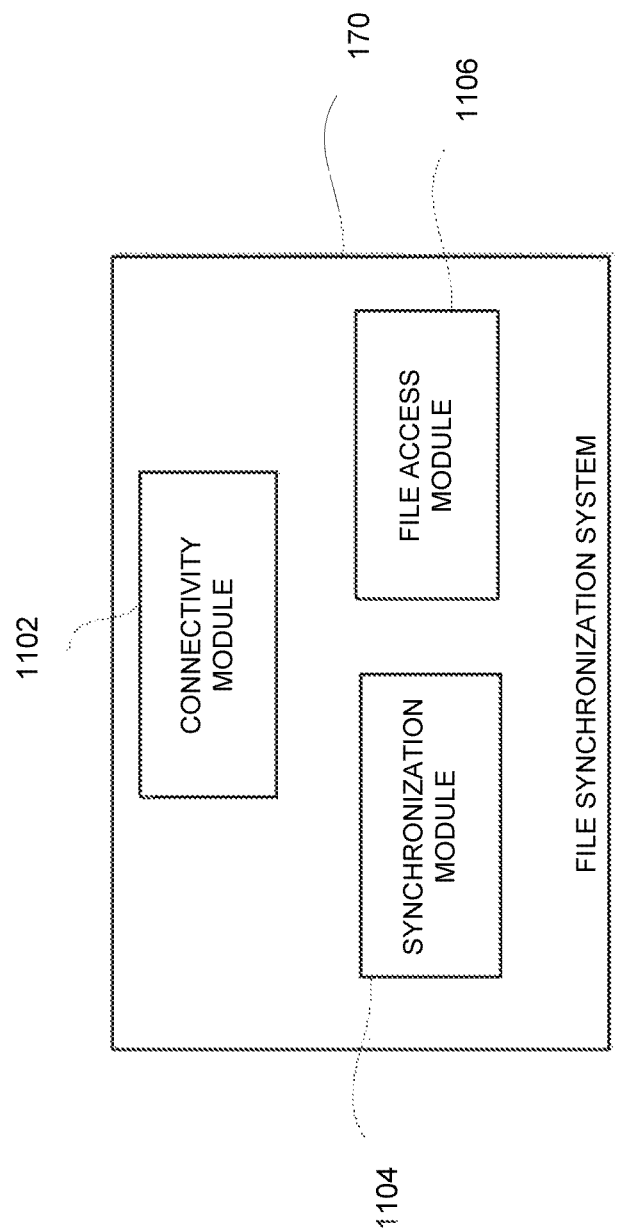
FIG. 11 illustrates an example of a file synchronization system.

In order to synchronize the document, the PES platform 120 can implement a file synchronization system 1100 shown in FIG. 11. In the illustrated embodiment, the file synchronization system 1100 includes a connectivity module 1102, a synchronization module 1104, and a file access module 1106. The connectivity module 1102 can be used to establish a connection between the PES and the user's computing device. As discussed below, in some implementations the connectivity between the PES and the user's computing device is bi-directional. In some such implementations, the bi-directional connection between the PES and the computing device is used for both delivering access to the virtual desktop instance and synchronizing files between the PES and the computing device. Continuing with the above example, the file access module 1106 may determine, based on metadata associated with the tablet device, that it is a computing device authorized to access and modify the particular Word document. Therefore, the tablet device is authorized to maintain a synchronized copy of the Word document, which may be accessible to the user even when the tablet device does not have internet connection. For example, as the user is editing the Word document, the tablet device might lose a network connection to the PES. However, because the file is configured to be synchronized with the tablet device, the modifications made while the network connection is lost can be synchronized with the copy of the file stored remotely on the PES platform 120 via the synchronization module 1104. For example, modifications to the file may be stored locally on the user computing device, and when network connectivity resumes, the modifications can be communicated to the synchronization module 1104 for synchronization with the filed stored on the PES platform.

The user may then try to edit the same document through a connection with the PES from her smartphone while she is on a taxi. Since smartphones can be easily lost, the user (or an entity associated with the user, such as her employer) may restrict access to certain documents on certain devices or when the user is in certain locations (e.g., to implement export restrictions or controls). Thus, in this example, the file access module 1106 may determine, based on the metadata associated with the smartphone or the user's location, that the user is not authorized to alter the content of the file from her smartphone in the taxi. Therefore, the changes the user attempted to make from her smartphone are not stored by the PES platform 120 and/or not be stored locally on the smartphone In another example, the user may edit an important CAD drawing on her office desktop PC through the virtual desktop instance on the PES platform 120. After the user shuts down her office PC, the edits she made to the CAD drawing are stored on the PES platform 120. The user may turn on her laptop computer at home and try to edit a synchronized copy of the CAD drawing stored locally. The file access module 1106 may determine, based on metadata associated with the CAD drawing and/or the user's laptop computer, that the user is not authorized to modify the CAD drawing from her laptop computer directly. However, the file access module 1106 may determine that she is authorized to edit the CAD drawing via the virtual desktop instance on the PES. This means the CAD drawing may only be editable from the virtual desktop instance. Therefore, none of the changes the user tried to make to the synchronized copy of the CAD drawing directly from her laptop computer may be stored by the PES platform 120. However, if the user is authorized to connect to a virtual desktop instance via the connectivity module 1102 from her laptop, and she executes a program from the virtual desktop instance to edit the CAD drawing, then she may be allowed to edit the drawing via the connection to the virtual desktop instance.

XIV. First Example File Synchronization Process

Figure 12:
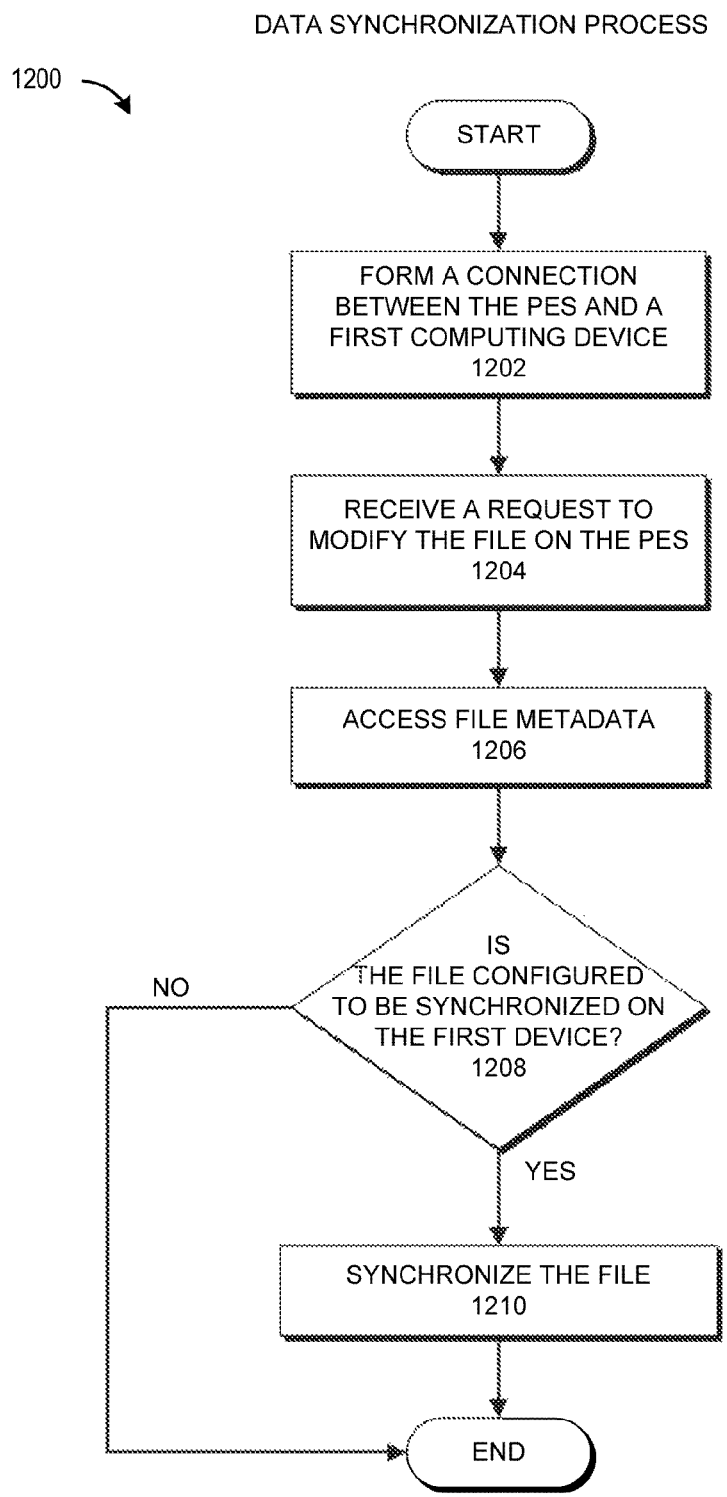
FIG. 12 illustrates an example of a file synchronization process.

FIG. 12 illustrates an example of a file synchronization process using the file synchronization system 1100 under the control of the PES platform 120. In the illustrated embodiment, the process 1200 begins at block 1202, where the connectivity module 1102 forms a connection (which may be bi-directional) between the PES and the user's computing device. The process continues to block 1204, where the PES platform 120 receives a request from the computing device to modify a file on the PES platform 120. The process continues to block 1206, where the PES platform 120 accesses file metadata using the file access module 1106. In this illustrated embodiment, the file metadata may include settings indicating whether the file may be synchronized with the computing device, etc.

The process continues to block 1208 to determine, based at least on the file metadata, whether the file is configured to be synchronized with the computing device. In some embodiments, this step may be performed by the file access module 508. If the file is not configured to be synchronized with the computing device, the process 1200 ends. However, if it is determined that the file can be synchronized with the computing device, process 1200 continues to block 1210, and the file is synchronized with the computing device by the synchronization module 1104 using the bi-directional connection formed in block 1202. The process ends after block 1210.

In some cases, the user may need to synchronize or modify a file through an application that is configured to be executed on a virtual desktop instance. For example, the user may have configured a virtual desktop instance that includes a Linux operating system and Matlab® software. The user may wish to synchronize the Matlab® programs and simulations she has made on her various computing devices. If the user already has an existing connection to the PES platform 120 through the virtual desktop instance, then the user may not need to have a program locally that is capable of modifying or opening the specific type of file.

XV. Second Example File Synchronization Process

Figure 13:
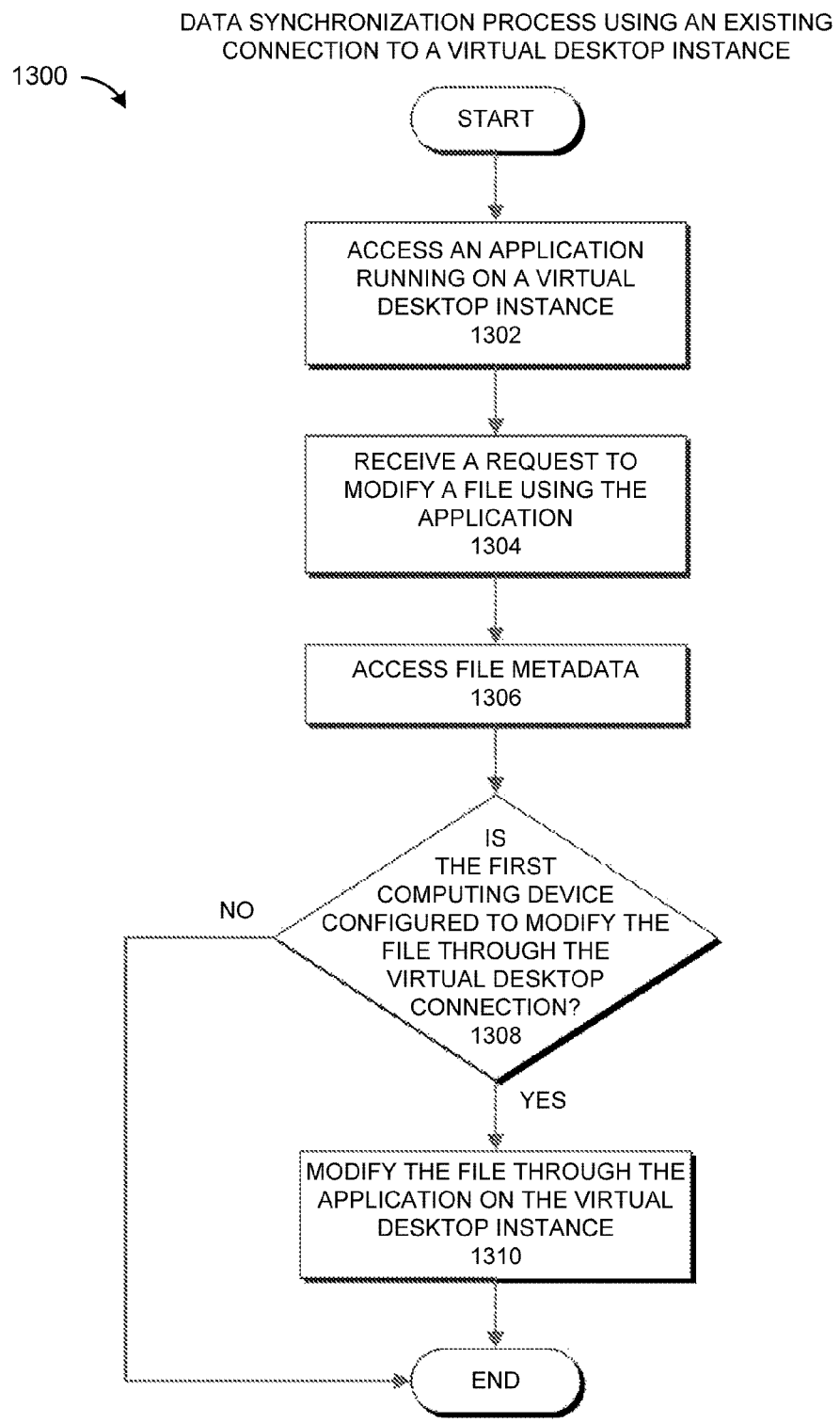
FIG. 13 illustrates an example of a file synchronization process through an existing connection to a virtual desktop instance.

FIG. 13 further illustrates an example of a file synchronization process through an existing connection to a virtual desktop instance at a data center. In this embodiment, the process 1300 begins at block 1302, where access to an application on a virtual desktop instance in the PES is provided by the connectivity module 1102. The process 1300 continues to block 1304, and the PES may receive a request from a computing device to modify the file through the application on the virtual desktop instance. The process 1300 continues to block 1306, and the PES accesses file metadata via the file access module 1106. The file metadata may indicate whether the file is configured to be modified by the first computing device, for example.

The process 1300 continues to block 1308 to determine whether the file is configured to be modified by the computing device. In the use case discussed above, a Matlab® program may be configured to be synchronized with the user's desktop computer, her laptop computer, but not her tablet device. In another example, the user may be traveling to a sales meeting overseas, and one of her Matlab® simulations may be configured to be synchronized with her tablet device so that she may easily demonstrate it at her meetings. In some cases, a file may be configured to be synchronized with a user computing device but not editable locally by the user computing device. In these cases, the file may be configured to be only editable via a virtual desktop instance. Accordingly, the metadata can be used to determine whether a particular computing device is authorized to modify the file, and if so, whether the copy of the file stored by the PES is to be synchronized to reflect the modifications to the file made by the user.

If the file is not configured to be modified by the computing device, the process 1300 ends. However, if the file access module 1106 determines that the file is configured to be modified by the computing device, process 1300 continues to block 1310 to allow the file to be modified by the computing device through the application on the virtual desktop. The modifications made by the computing device through the application on the virtual desktop are synchronized and stored by the PES. The process ends after block 1310. For example, a Matlab® simulation file may be configured to be synchronized with the user's tablet device and modified by the tablet device via a virtual desktop instance. After the user makes changes to the Matlab® simulation file on a virtual desktop instance on the PES platform 120, the updates to the simulation file may be synchronized to her tablet device, also connected to a virtual desktop instance on the PES platform 120. If the file is also configured to be modified by the tablet device via a connection to the virtual desktop instance, the user may modify the file from her tablet device. The modifications she made will be synchronized by the PES with other authorized computing devices. In some embodiments, the user may view a synchronized local copy of a file with or without a network connection on her tablet device.

In some cases, more than one computing device may be configured to maintain a synchronized copy of a file. Also, in some cases, more than one version of a file may be configured to be stored. For example, a user may make changes to a Matlab® simulation file from her office computer, which is connected to a virtual desktop instance running the Matlab® software. After testing the updated file, she may decide to undo the changes she has just made. She may choose to maintain a synchronized copy of the simulation file that is a previous version without all the changes that were made by her. In another example, the user may choose to synchronize on her laptop a version of the Matlab® simulation that is the most stable version for a sales meeting. She may choose not to synchronize the most up-to-date version. Instead, she may specify a version of the file that she wishes to maintain on her laptop computer. A plurality of versions of the file may be offered to the user so she may choose the version she wants to maintain on a specific computing device.

In some embodiments, the differences between multiple versions of the same file may be presented to a user, which can help the user in deciding which version of the file to maintain on a computing device.

XVI. Terminology

A number of computing systems have been described throughout this disclosure. The descriptions of these systems are not intended to limit the teachings or applicability of this disclosure. For example, the user systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of the data center resource allocation system 330 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A computer-implemented method, the method comprising:
    as implemented by one or more computing devices configured with specific computer-executable instructions,
        receiving a request at a data center comprising a plurality of computing resources to obtain access to a computing resource from the plurality of computing resources, wherein the request is received from a computing device of an entity that is separate from the one or more computing devices;
        determining a set of resource access rules based at least in part on an identity of the entity, wherein the set of resource access rules comprises one or more rules for providing the entity with access to the computing resource, and wherein the set of resource access rules are configured to reduce the effect of a system failure at the data center on access to the computing resource by the entity;
        determining whether an active instance of the computing resource associated with the entity exists;
        in response to determining that the active instance of the computing resource exists, determining whether the active instance satisfies the set of resource access rules; and
        in response to determining that the active instance satisfies the set of resource access rules, providing the entity with access to the active instance of the computing resource,
        wherein the set of resource access rules are received from a user associated with the entity who is authorized to provide the set of resource access rules for a sub-entity of the entity,
        wherein the identity of the entity corresponds to the sub-entity and the set of resource access rules corresponds to the sub-entity, and
        wherein providing the entity with access to the active instance of the computing resource comprises providing the sub-entity with access to the active instance of the computing resource.

2. The computer-implemented method of claim 1, wherein providing the entity with access to the active instance of the computing resource comprises providing a second user associated with the sub-entity with access to the active instance of the computing resource.

3. The computer-implemented method of claim 1, wherein, in response to determining that the active instance of the computing resource does not exist, the method further comprises:
    instantiating a new instance of the computing resource based at least in part on the set of resource access rules; and
    providing the entity with access to the new instance of the computing resource.

4. The computer-implemented method of claim 3, wherein instantiating the new instance of the computing resource comprises:
    identifying a computing system at the datacenter based at least in part on the set of resource access rules; and
    instantiating the new instance of the computing resource on the identified computing system.

5. The computer-implemented method of claim 1, wherein the request is associated with a second user of the entity and the active instance of the computing resource is located at a computing system of the data center, and wherein determining whether the active instance satisfies the set of resource access rules comprises:
    determining whether a number of additional users of the entity accessing the computing system satisfies a user threshold; and
    in response to determining that the number of additional users of the entity accessing the computing system satisfies the user threshold, designating the active instance of the computing resource as failing to satisfy the set of resource access rules.

6. The computer-implemented method of claim 5, wherein the second user and the number of additional users share a designation at the entity.

7. The computer-implemented method of claim 1, wherein the data center is one of a plurality of data centers associated with a program execution service, and wherein the program execution service is managed by a different entity than the entity.

8. A system comprising:
an electronic data store configured to at least store a set of resource access rules; and
a management computing system comprising computer hardware in communication with the electronic data store, the management computing system configured to execute computer-executable instructions to at least:
receive the set of resource access rules from a first user associated with an entity;
determine whether the first user is authorized to provide the set of resource access rules for the entity and for a sub-entity of the entity;
in response to determining that the first user is authorized to provide the set of resource access rules, associate the set of resource access rules with the entity and with the sub-entity at the electronic data store;
receive a request to obtain access to a computing resource from a plurality of computing resources hosted by a data center, wherein the request is received from a computing device of the entity, the computing device external to the data center;
identify the set of resource access rules based at least in part on an identity of the entity, wherein the set of resource access rules comprises one or more rules for providing the entity with access to the computing resource, and wherein the set of resource access rules are configured to reduce the effect of a system failure at the data center on access to the computing resource by the entity;
select, based at least in part on the identified set of resource access rules, a host computing system from a plurality of host computing systems at the data center capable of hosting the computing resource; and
provide a second user associated with the entity with access to the computing resource on the selected host computing system.

9. The system of claim 8, wherein the set of resource access rules is one set of a plurality of sets of resource access rules and wherein at least one set of resource access rules from the plurality of sets of resource access rules is associated with a different entity than the entity associated with the set of resource access rules.

10. The system of claim 8, wherein the management computing system is further configured to execute computer-executable instructions to at least:
identify a classification for the second user; and
identify the set of resource access rules based at least in part on the classification for the second user.

11. The system of claim 10, wherein the classification for the second user is based at least in part on an employment role at the entity or a user profile for the second user, wherein the user profile relates to historical computer resource usage by the second user.

12. The system of claim 8, wherein the management computing system is further configured to execute computer-executable instructions to at least instantiate an instance of the computing resource on the selected host computing system, wherein providing the second user associated with the entity with access to the computing resource comprises providing the second user with access to the instance of the computing resource on the selected host computing system.

13. The system of claim 8, wherein the management computing system is further configured to execute computer-executable instructions to at least:
determine whether an active instance of the computing resource associated with the entity exists;
in response to determining that the active instance of the computing resource exists, determine whether the active instance satisfies the set of resource access rules; and
in response to determining that the active instance satisfies the set of resource access rules, select a computing system with the active instance as the host computing system.

14. The system of claim 13, wherein the active instance comprises a cached instance of the computing resource.

15. A computer-readable, non-transitory storage medium storing computer executable instructions that, when executed by one or more computing devices, configure the one or more computing devices to perform operations comprising:
receiving a set of resource access rules from a first user associated with an entity;
determining whether the first user is authorized to provide the set of resource access rules for the entity and for a sub-entity of the entity;
in response to determining that the first user is authorized to provide the set of resource access rules, associating the set of resource access rules with the entity and with the sub-entity;
receiving a request to obtain access to a computing resource from a plurality of computing resources hosted by at least one data center from a plurality of data centers, wherein the request is received from a computing device of an entity, the computing device external to the plurality of data centers;
selecting the set of resource access rules based at least in part on an identity of the entity, wherein the set of resource access rules comprises one or more rules for providing a second user from a plurality of users associated with the entity with access to the computing resource;
selecting a data center from the plurality of data centers based at least in part on the computing resource and the identified set of resource access rules;
selecting a host computing system from a plurality of host computing systems at the selected data center based at least in part on the set of resource access rules; and
providing the second user with access to the computing resource on the selected host computing system.

16. The computer-readable, non-transitory storage medium of claim 15, wherein the plurality of data centers are geographically distributed, and wherein the plurality of data centers are associated with a program execution service.

17. The computer-readable, non-transitory storage medium of claim 15, wherein selecting the set of resource access rules based at least in part on an identity of the entity comprises selecting the set of resource access rules based at least in part on an organizational unit associated with the second user at the entity.

18. The computer-readable, non-transitory storage medium of claim 15, wherein the set of resource access rules are configured to distribute computing resource access by the plurality of users among multiple data centers of the plurality of data centers.

* * * * *